United States Patent [19]
Stephenson et al.

[11] Patent Number: 5,623,698
[45] Date of Patent: Apr. 22, 1997

[54] MEMORY INTERCONNECT NETWORK HAVING SEPARATE ROUTING NETWORKS FOR INPUTS AND OUTPUTS USING SWITCHES WITH FIFO QUEUES AND MESSAGE STEERING BITS

[75] Inventors: Bricky A. Stephenson; Peter G. Logghe, both of Chippewa Falls, Wis.

[73] Assignee: Cray Research, Inc., Eagan, Minn.

[21] Appl. No.: 55,814

[22] Filed: Apr. 30, 1993

[51] Int. Cl.$^6$ .................................................. G06F 13/00
[52] U.S. Cl. .......................... 395/858; 395/872; 395/800; 395/475; 395/477
[58] Field of Search ................................. 395/575, 325, 395/182.09, 858, 827, 800, 475, 477; 370/94.3, 1; 307/480; 365/221; 340/825.8

[56] References Cited

U.S. PATENT DOCUMENTS

| | | | |
|---|---|---|---|
| 3,676,852 | 7/1972 | Abernathy et al. | 395/650 |
| 4,412,303 | 10/1983 | Barnes et al. | 395/800 |
| 4,630,260 | 12/1986 | Toy et al. | 370/60 |
| 4,809,232 | 2/1989 | Baumbaugh et al. | 365/221 |
| 4,811,210 | 3/1989 | McAulay | 395/312 |
| 4,821,034 | 4/1989 | Anderson et al. | 340/825.8 |
| 4,952,930 | 8/1990 | Franaszet et al. | 340/825.8 |
| 4,970,418 | 11/1990 | Masterson | 307/480 |
| 5,008,812 | 4/1991 | Bhandarkar et al. | 395/375 |
| 5,018,129 | 5/1991 | Netravali et al. | 370/1 |
| 5,021,945 | 6/1991 | Morrison et al. | 395/375 |
| 5,088,091 | 2/1992 | Schroeder et al. | 370/94.3 |
| 5,179,702 | 1/1993 | Spix et al. | 395/650 |
| 5,287,491 | 2/1994 | Hsu | 395/575 |
| 5,299,317 | 3/1994 | Chen et al. | 395/325 |
| 5,321,813 | 6/1994 | McMillen et al. | 395/182.09 |

FOREIGN PATENT DOCUMENTS

| | | |
|---|---|---|
| 0166268 | 1/1986 | European Pat. Off. . |
| 0325384 | 7/1989 | European Pat. Off. . |
| 0392184 | 10/1990 | European Pat. Off. . |
| 0477405 | 4/1992 | European Pat. Off. . |
| 0510821 | 10/1992 | European Pat. Off. . |

OTHER PUBLICATIONS

"A Pipelined, Shared Resource MIMD Computer", by Smith, Proceedings of the 1978 International Conference on Parallel Processing, pp. 39–41.

"Architecture and Applications of the HEP Multiprocessor Computer System", by Smith, SPIE vol. 298, Realtime Signal Processing IV, (1981) pp. 486–493.

"Some Computer Organizations and their Effectiveness", by Flynn, IEEE Transactions on Computers, vol. C–21, No. 9, Sep. 1972.

"The Horizon Supercomputing System: Architecture and Software", by Smith et al. Proceedings in Supercomputing '88, pp. 28–34.

"The Monarch Parallel Processor Hardware Design", by Rettberg et al., Computer, Apr. 1990, pp 18–30.

"A Processor Architecture for Horizon", by Smith et al., Proceedings in Supercomputing '88, pp. 35–41.

Hockney and Jessup, Parallel Computers 2, pp. 313–322.

Patent Abstracts of Japan, vol. II, No. 243 (P–603) 2690 Aug. 8, 1987 & JP 62052667 (Hitachi) Mar. 7, 1987.

(List continued on next page.)

Primary Examiner—Thomas C. Lee
Assistant Examiner—Le Hien Luu
Attorney, Agent, or Firm—Schwegman, Lundberg, Woessner & Kluth, P.A.

[57] ABSTRACT

A processor to memory interconnect network can be used to construct both small and large scale multiprocessing systems. The interconnect network includes network modules and memory modules. The network and memory modules are constructed of a series of n×m switches, each of which route n inputs to m outputs. The switches are designed such that message contention in the interconnect network is reduced. The switches, and thus the memory and network modules are highly modular, thus allowing virtually any scale multiprocessing system to be constructed utilizing the same components.

23 Claims, 32 Drawing Sheets

OTHER PUBLICATIONS

Proceedings of the 1983 International Conference on Parallel Processing, Aug. 23, Columbus, Ohio, USA, pp. 524–529; Gajski: "Cedar – a Large Scale Multiprocessor", p. 526.

WESCON/87 Conference Record, vol. 31, 1987, Los Angeles USA Wainwright: "Register Banks Boost 16/32 Bit Cpu Performance", pp. 5–7.

"Architecture and Applications of the Connection Machine", by Lewis W. Tucker et al., *Computer,* Aug. 1988, pp. 26–38.

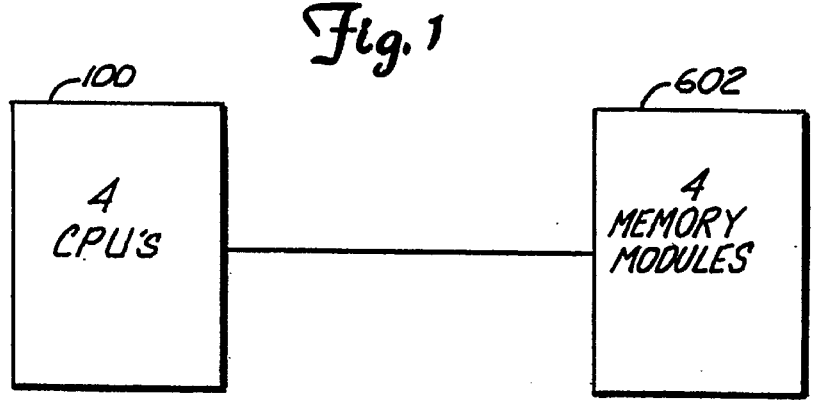
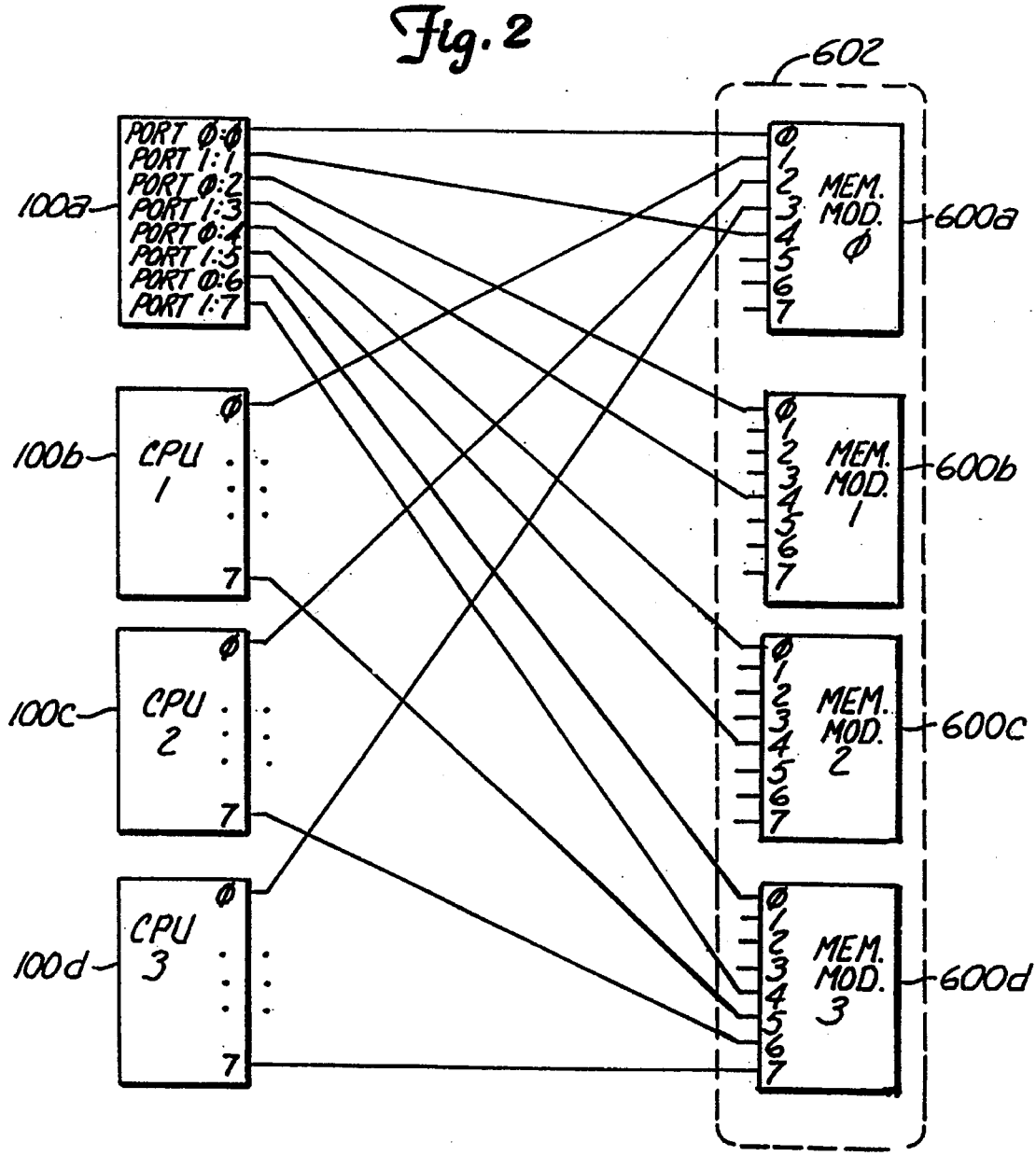

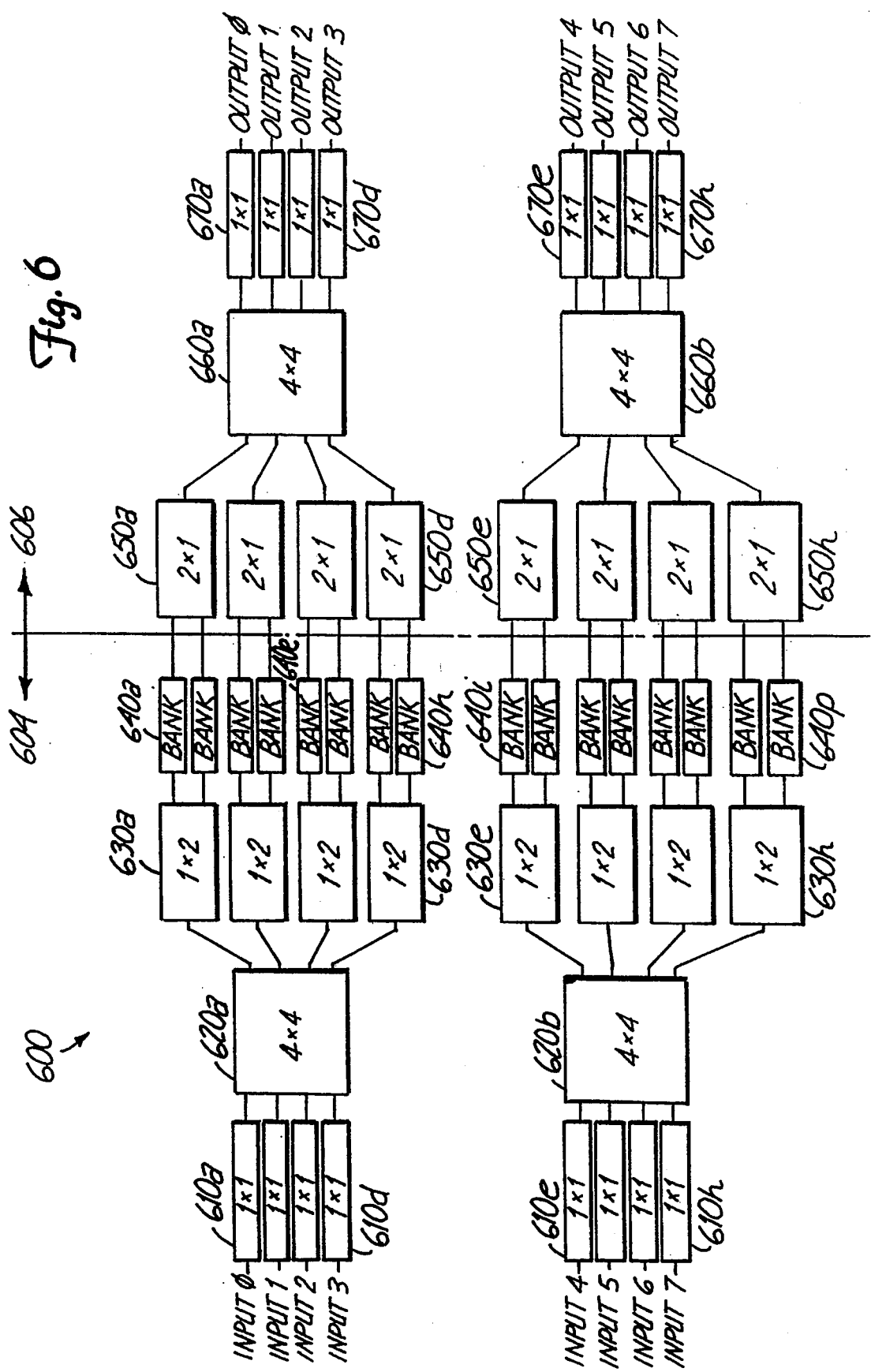

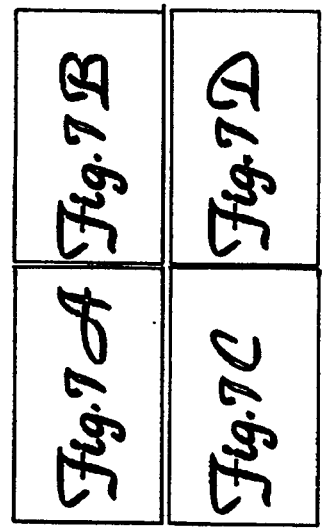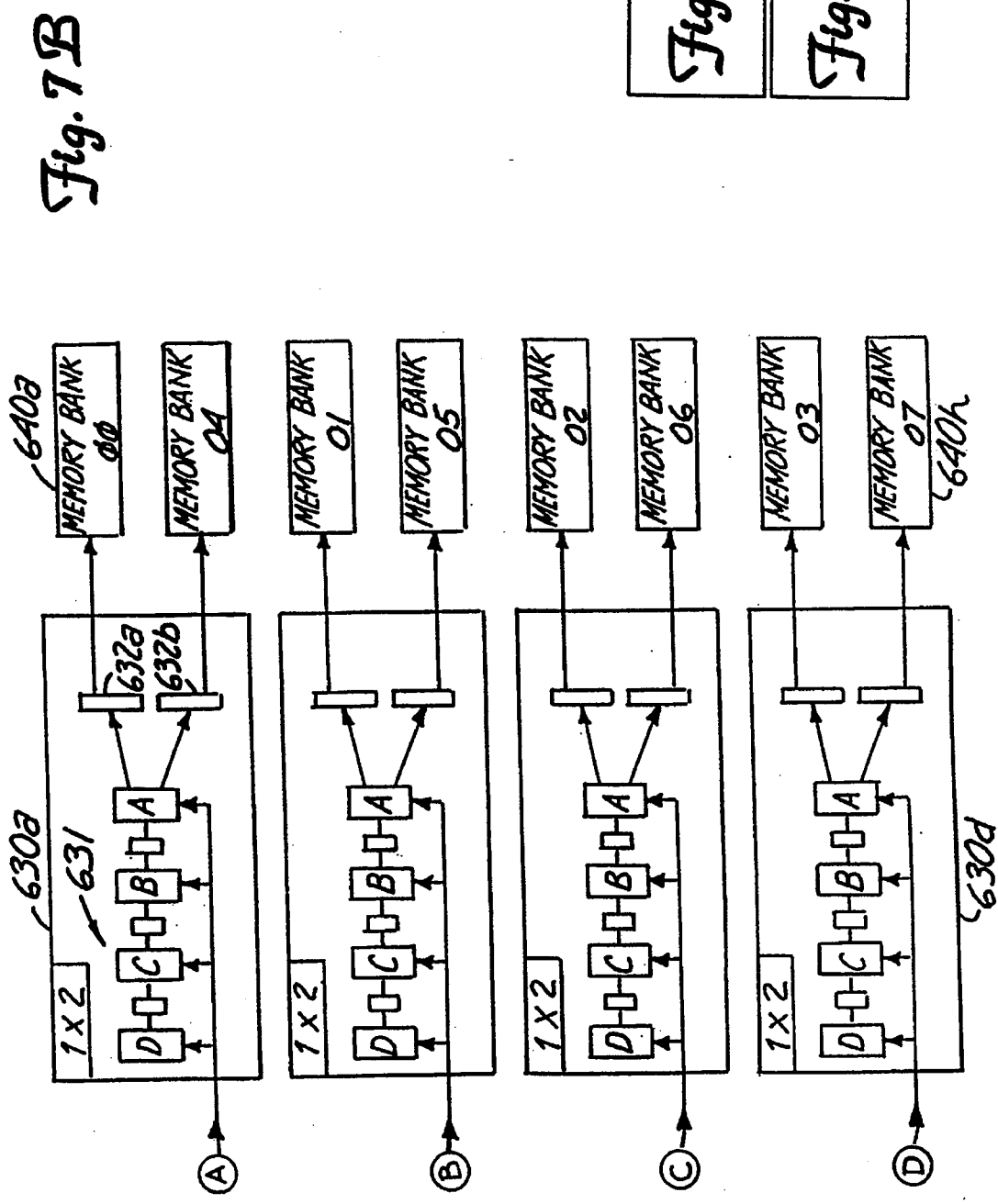

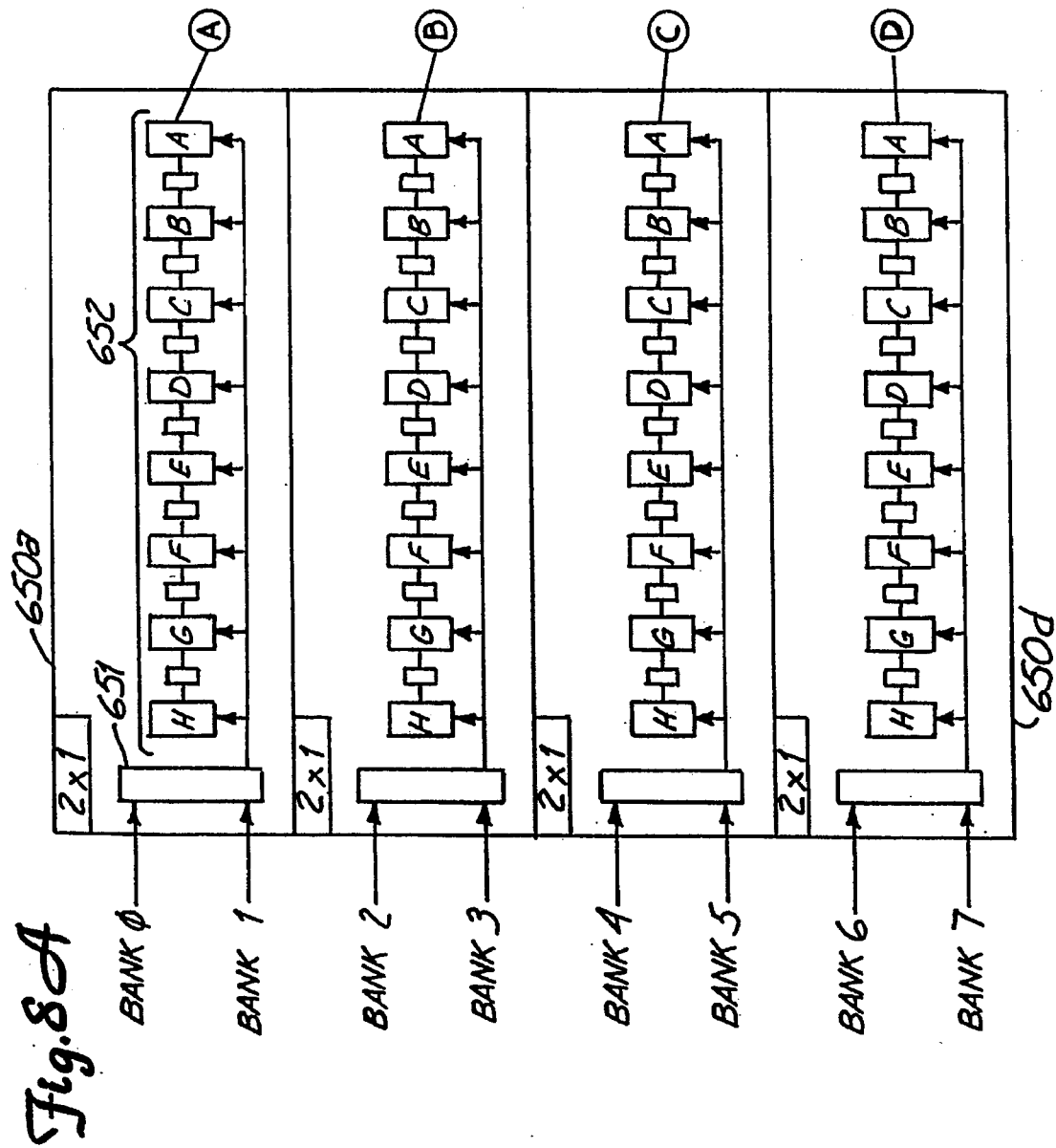

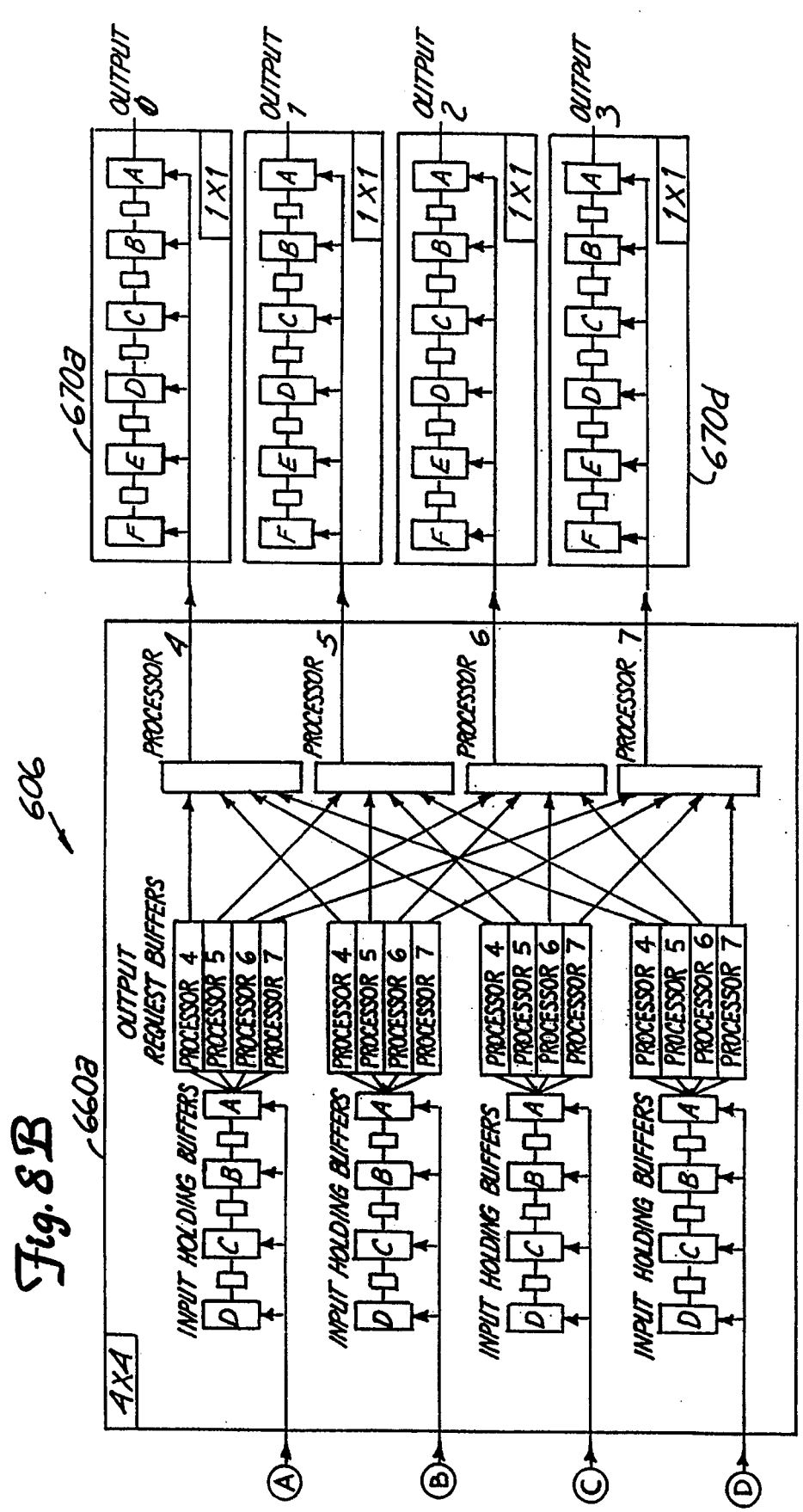

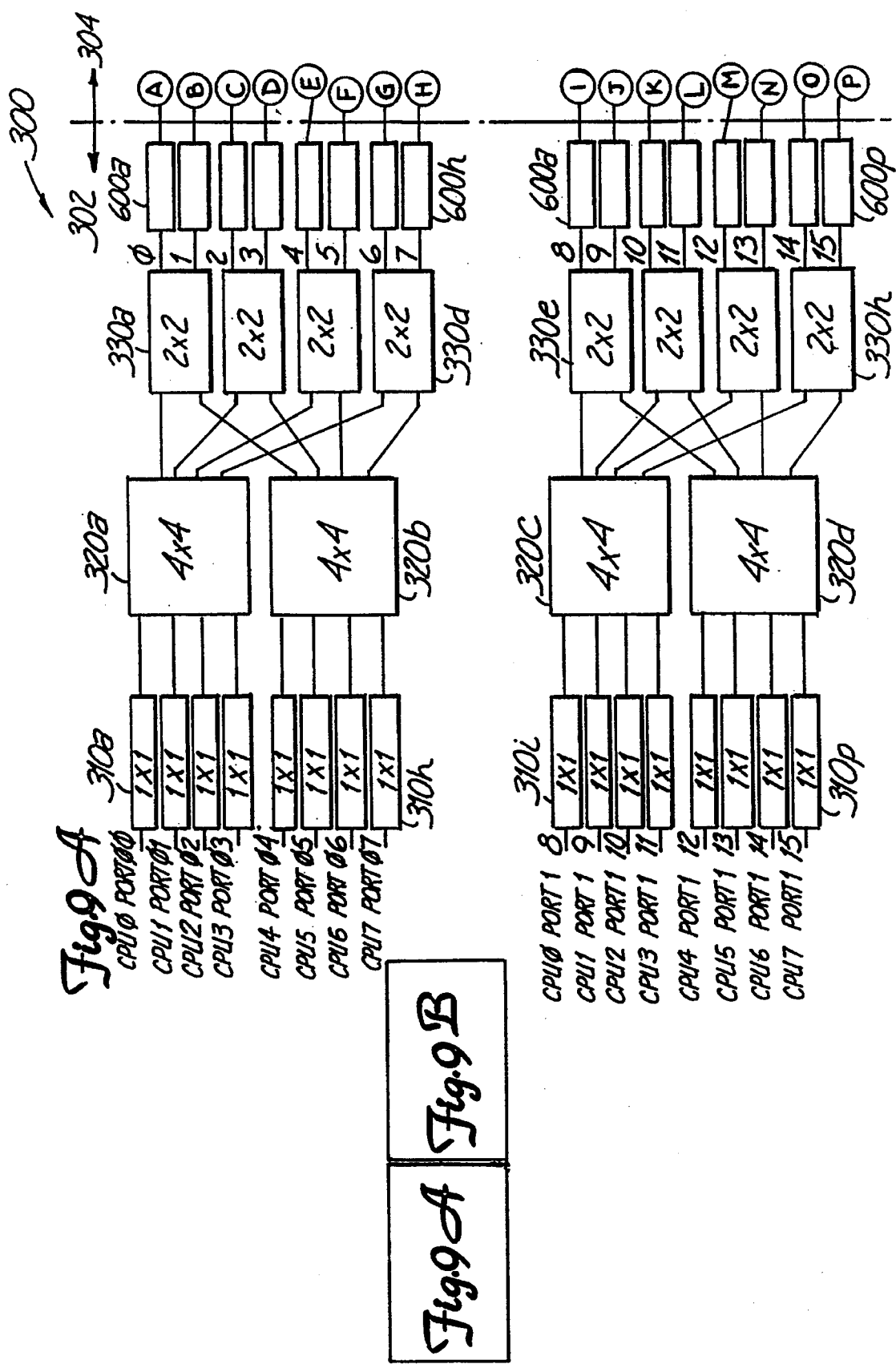

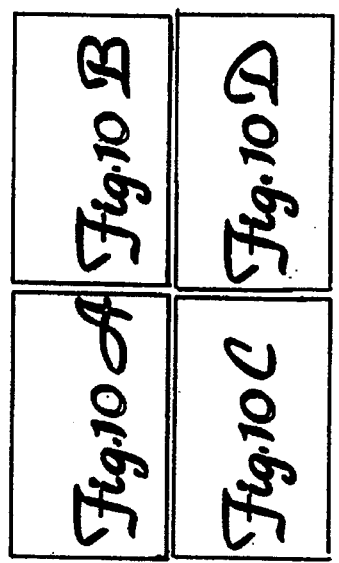
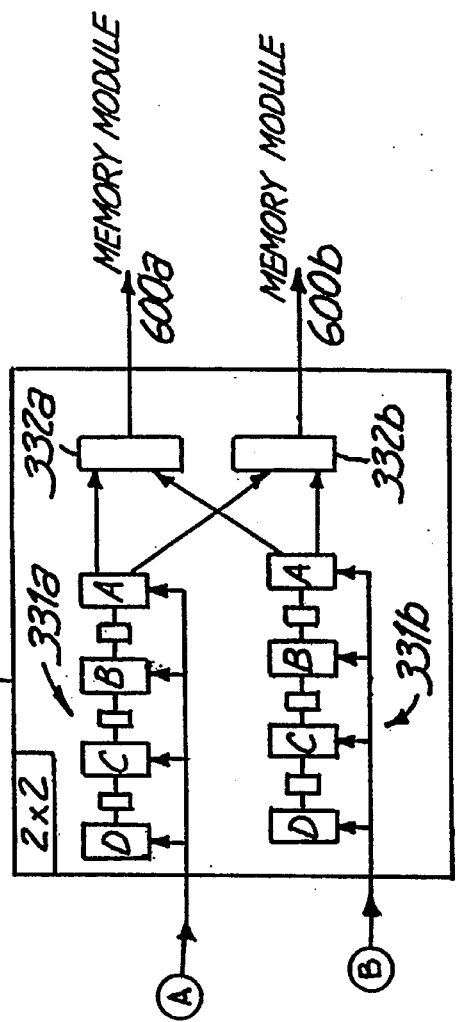
Fig. 10B

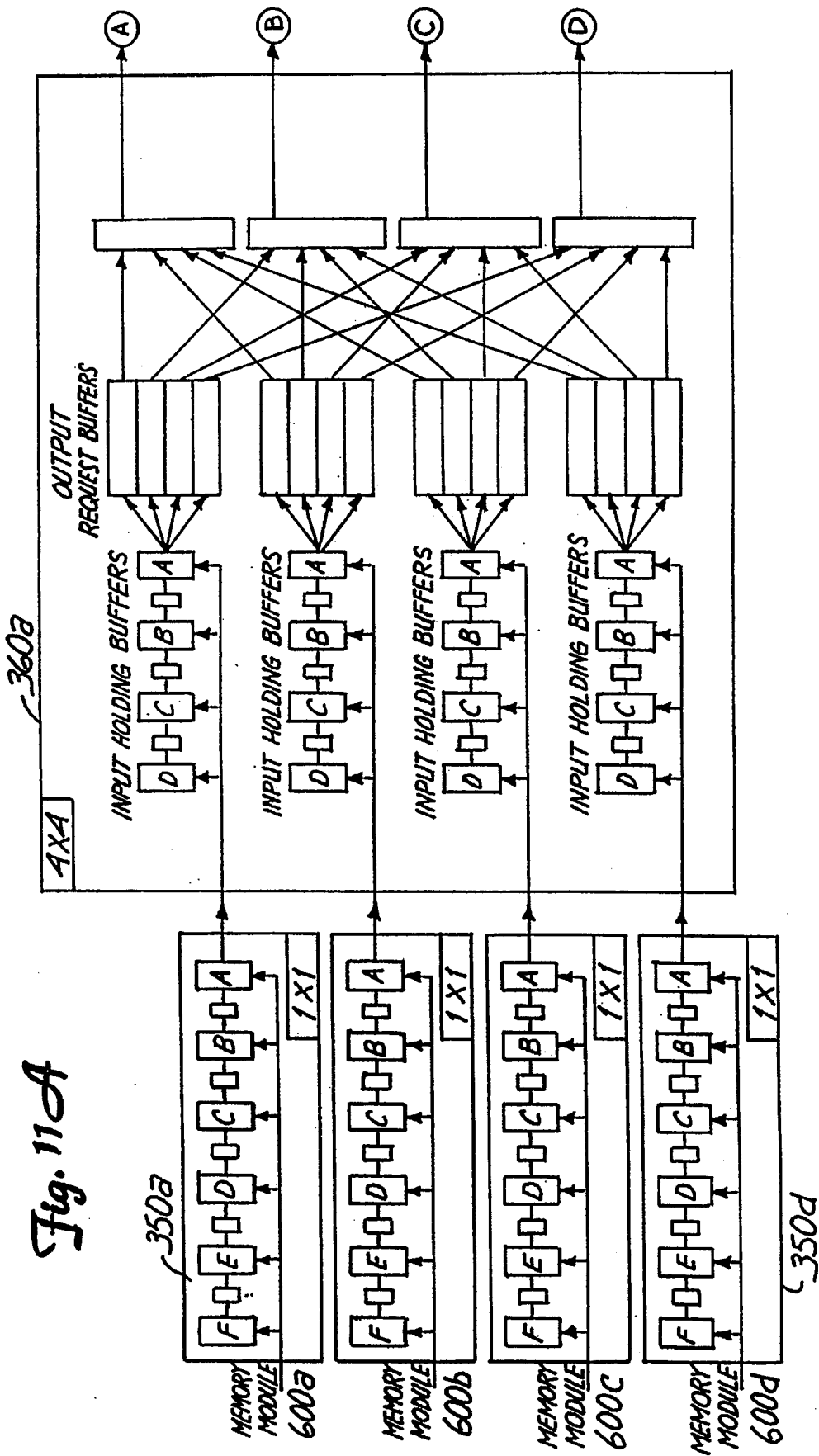

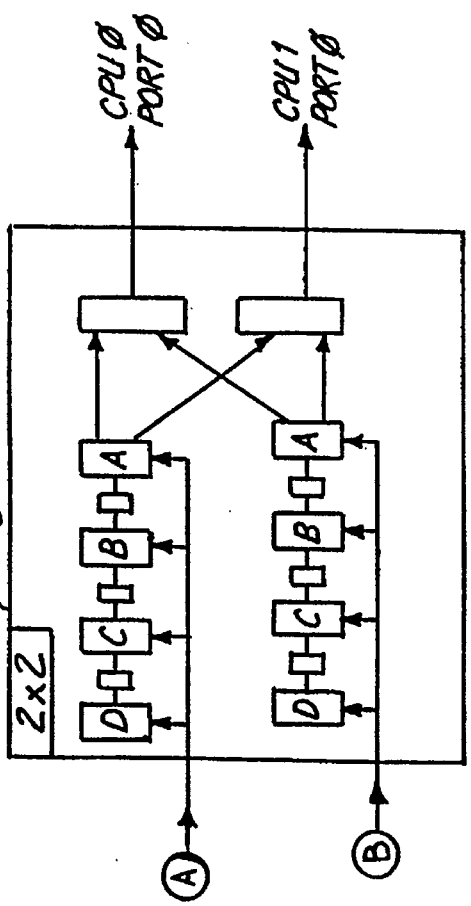
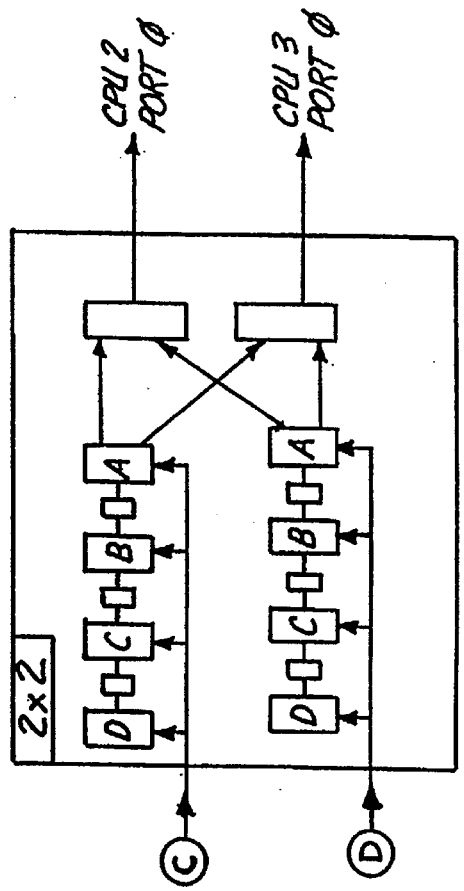

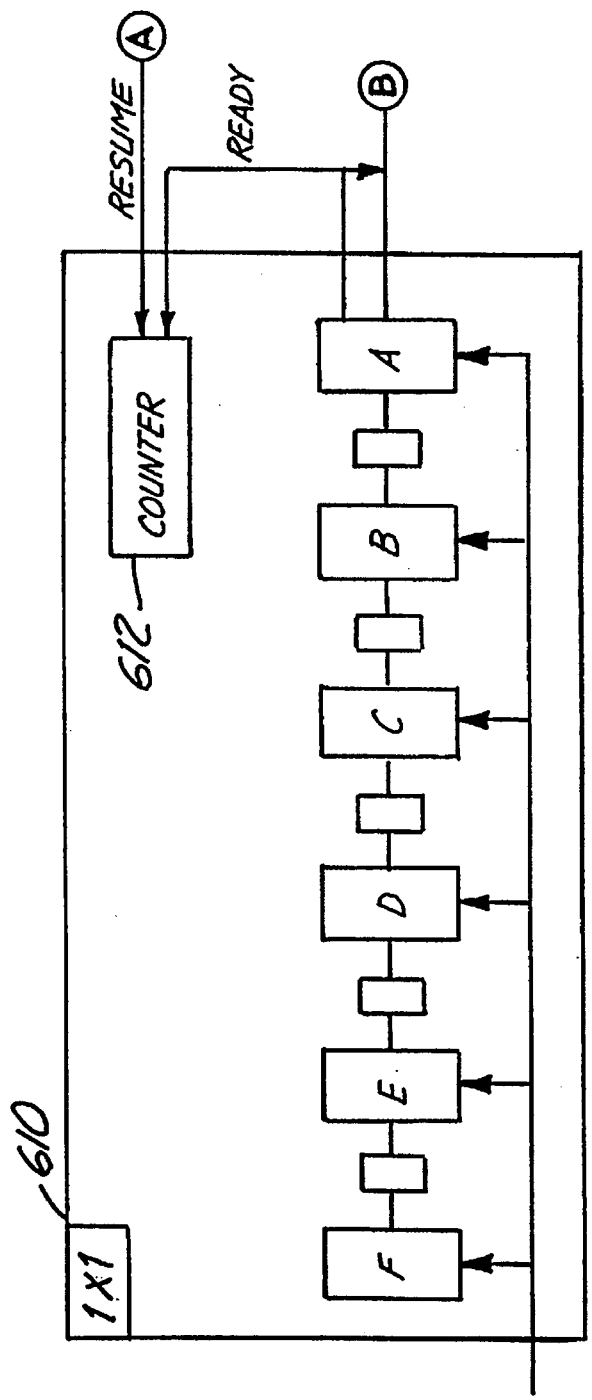

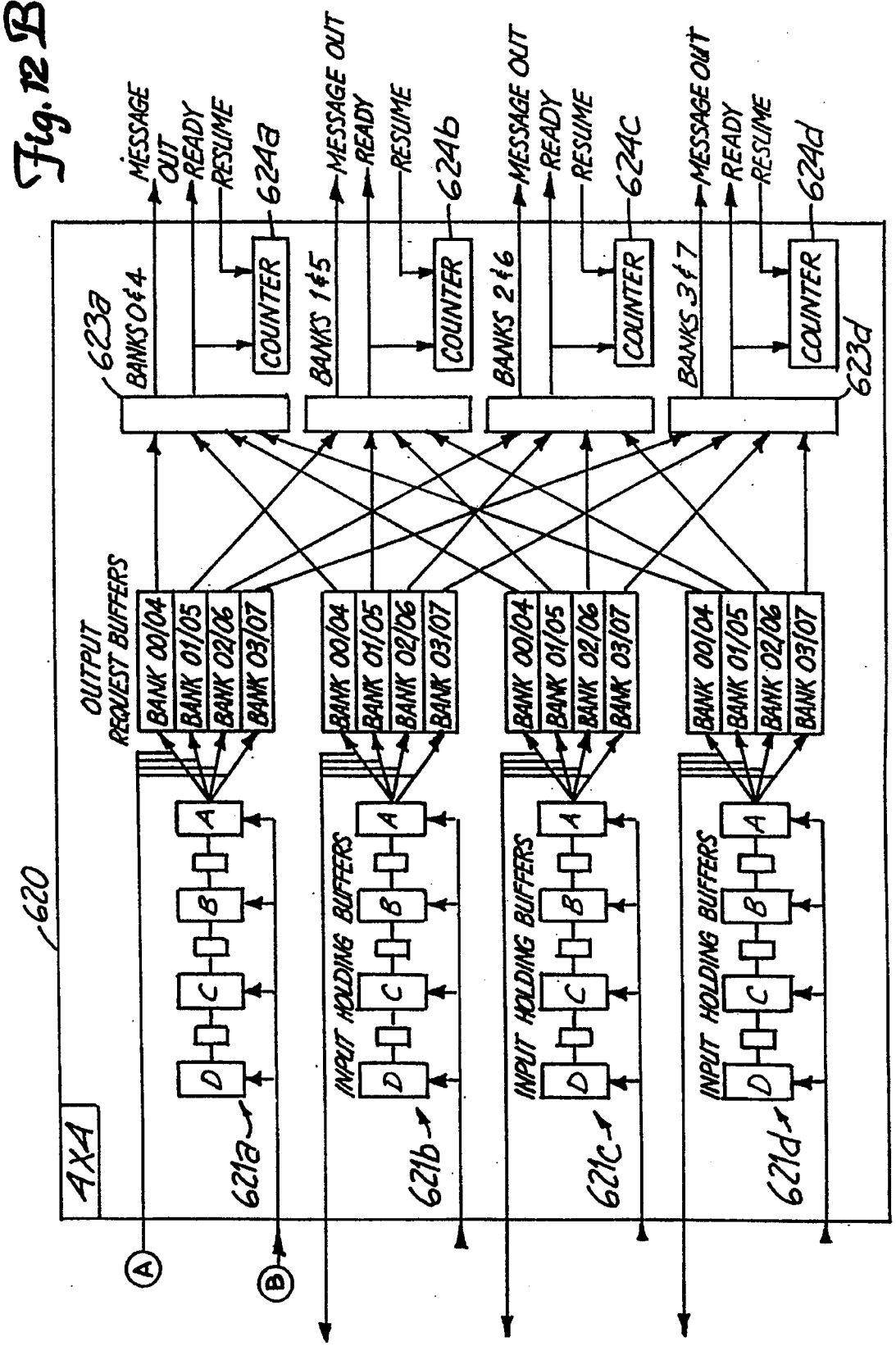

Fig. 14

(-- BIT FORCED TO ZERO)

| MODULE COUNTS | | SECTION CONFIGURATION | | | | ADDRESS BIT LAYOUT | | | |
|---|---|---|---|---|---|---|---|---|---|
| PROCESSOR | NETWORK | MEMORY | SECTIONS PER CPU | SUBSEC PER SEC | TOTAL BANKS | SECTION | SUB-SECTION | BANKS | CHIP ADDRESS |
| 1 TO 4 | 0 | 4 | 8 | 1 | 64 | 00,01,02 | --,--,-- | 03,04,05,-- | 06 THRU 31 |
| 1 TO 4 | 0 | 4 | 8 | 1 | 32 | 00,01,02 | --,--,-- | 03,04,--,-- | 05 THRU 30 |
| 1 TO 4 | 0 | 4 | 4 | 1 | 32 | 00,01,-- | --,--,-- | 02,03,04,-- | 05 THRU 30 |
| 1 TO 4 | 0 | 4 | 4 | 1 | 16 | 00,01,-- | --,--,-- | 02,03,--,-- | 04 THRU 29 |

Fig. 15

(-- BIT FORCED TO ZERO)

| MODULE COUNTS | | | SECTION CONFIGURATION | | | ADDRESS BIT LAYOUT | | | |
|---|---|---|---|---|---|---|---|---|---|
| PROCESSOR | NETWORK | MEMORY | SECTIONS PER CPU | SUBSEC PER SEC | TOTAL BANKS | SECTION | SUB-SECTION | BANK | CHIP ADDRESS |
| 8 | 16 | 8 | 8 | 2 | 128 | 00,01,02 | 03,--,-- | 04,05,06,-- | 07 THRU 32 |
| 8 | 16 | 8 | 8 | 2 | 64 | 00,01,02 | 03,--,-- | 04,05,--,-- | 06 THRU 31 |
| 8 | 16 | 8 | 4 | 2 | 64 | 00,01,-- | 02,--,-- | 03,04,05,-- | 06 THRU 30 |
| 8 | 16 | 8 | 4 | 2 | 32 | 00,01,-- | 02,--,-- | 03,04,--,-- | 05 THRU 30 |
| 8 | 16 | 16 | 8 | 4 | 256 | 00,01,02 | 03,04,-- | 05,06,07,-- | 08 THRU 33 |
| 8 | 16 | 16 | 8 | 4 | 128 | 00,01,02 | 03,04,-- | 05,06,--,-- | 07 THRU 32 |
| 8 | 16 | 16 | 4 | 4 | 128 | 00,01,-- | 02,03,-- | 04,05,06,-- | 07 THRU 32 |
| 8 | 16 | 16 | 4 | 4 | 64 | 00,01,-- | 02,03,-- | 04,05,--,-- | 06 THRU 31 |
| 8 | 32 | 32 | 8 | 8 | 512 | 00,01,02 | 03,04,05 | 06,07,08,-- | 09 THRU 34 |
| 8 | 32 | 32 | 8 | 8 | 256 | 00,01,02 | 03,04,05 | 06,07,--,-- | 08 THRU 33 |
| 8 | 32 | 32 | 4 | 8 | 256 | 00,01,-- | 02,03,04 | 05,06,07,-- | 08 THRU 33 |
| 8 | 32 | 32 | 4 | 8 | 128 | 00,01,-- | 02,03,04 | 05,06,--,-- | 07 THRU 32 |

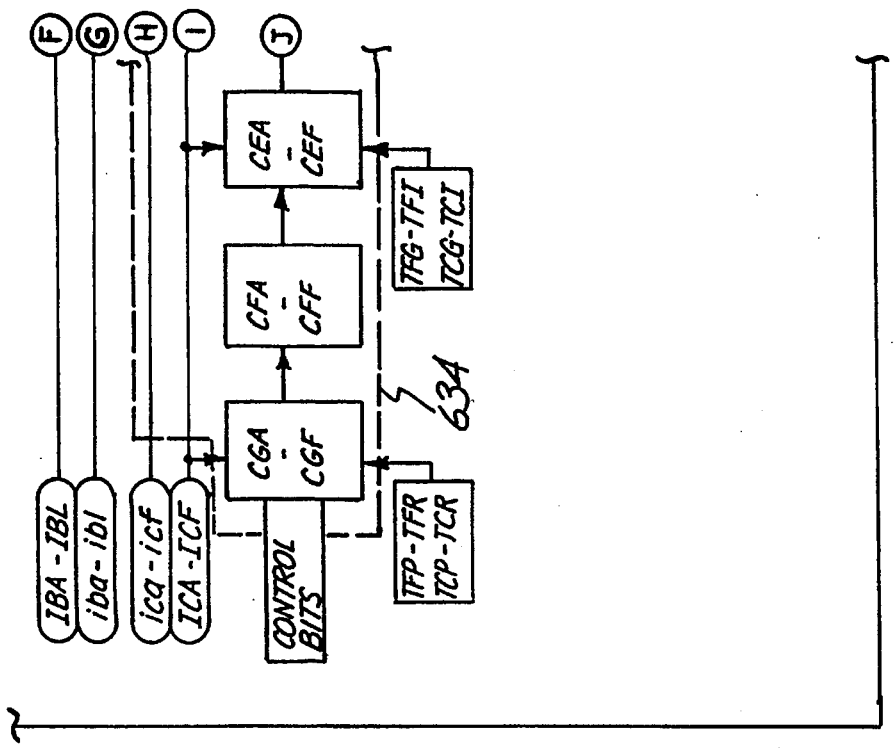
Fig. 16C
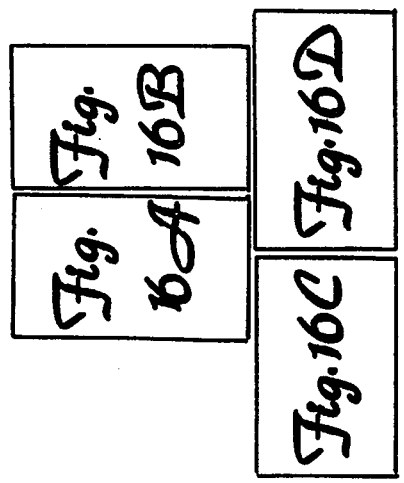

MEMORY INTERCONNECT NETWORK HAVING SEPARATE ROUTING NETWORKS FOR INPUTS AND OUTPUTS USING SWITCHES WITH FIFO QUEUES AND MESSAGE STEERING BITS

BACKGROUND

Many data processing tasks involve extensive arithmetic manipulation of ordered arrays of data. Commonly, this type of manipulation or "vector" processing involves performing the same operation repetitively on each successive element of a set of data. In order to increase processing speed and hardware efficiency when dealing with ordered arrays of data, vector computing machines have been developed. A vector machine is one which deals with ordered arrays of data by virtue of its hardware organization, thus attaining a higher speed of operation than scalar machines.

Computer processing speed and efficiency in both scalar and vector machines can be further increased through the use of multiprocessing techniques. Multiprocessing involves the use of several hundreds or thousands of processors sharing system resources, such as main memory. Independent tasks of different jobs or related tasks of a single job may be run on the multiple processors. Each processor obeys its own set of instructions, and the processors execute their instructions in parallel. By increasing the number of processors and operating them in parallel, more work can be done in a shorter period of time.

Although multiprocessing can increase performance speed, the increase is not linearly related to the number of processors employed. This is largely due to two factors: overhead and lockout. Significant overhead is introduced in a multiprocessor environment because of the increased level of control and synchronization required to coordinate the processors and processor functions. Communication between and control of all the processors introduces performance degradation into multiprocessing systems. When several processors are cooperating to perform a task, data dependencies and the passing of data between processors are inevitable. Processor idle time is introduced when one processor must wait for data to be passed to it from another processor. This processor idle time results in a reduction in system performance.

The other significant cause of multiprocessor system degradation is processor lockout, or blocking, associated with multiple processors sharing common resources. This occurs when one processor attempts to access a shared resource, such as shared memory, which another processor is already using. The processor is thus blocked from using the shared resource and must wait until the other processor is finished. Again, processor idle time occurs and system performance is reduced.

Closely tied to the concepts of overhead and lockout and which also effects overall machine performance is the processor to memory interface. One example of a multiprocessor interface can be found in the Monarch parallel multiprocessing computer, designed by BBN Systems and Technologies Corporation. The Monarch is a scalar, single threaded multiprocessing architecture, which uses a circuit switching technique to communicate between processors and memory. According to this circuit switching technique, all processors share the same path to memory. When a processor in the Monarch design has a memory request, the entire path from the processor network to memory is opened up and is kept open until the communication between the memory and the processor is completed. This scheme can choke off other processors which are attempting to reference memory through the circuit switching network, limiting the reference transfer rate and resulting in a high amount of processor idle time. Such a design is therefore not practical for use in multiprocessor, multithreaded, vector processing in which an inherently large volume of data must be passed between the processors and the memory.

Another example of a multiprocessor memory interface can be found in the HORIZON routing scheme. The HORIZON interface network uses a scheme called desperation routing, or hot potato routing. HORIZON's desperation routing is a multi-stage network which has multiple inputs and the equivalent measure of outputs. This routing scheme requires that every input is routed to an output every network cycle. For example, if there are four input references, and each of the four input references wants to go to the same output, one of the four input references goes to the right output and all the other inputs go to some other, undesired output. This means that three out of the four inputs take a much longer path through the network. The HORIZON desperation network is routed in such a fashion that these other three references will eventually come back to the desired input and have another opportunity to get to the desired output. So that references will not be forever lost in the network, the HORIZON routing scheme has a mechanism such that references that have been in the network the longest have the highest priority so that they will eventually win out over contending references for the same output. Those skilled in the art will readily recognize that such a routing scheme results in a single reference having multiple possible routes to the desired end point, and that many references can spend a very long period of time fighting traffic in the network before they arrive at their destination. Thus, the HORIZON desperation routing scheme is also not desirable for use in multiprocessing machines.

Another important concept in multiprocessing systems is the concept of scalability. Scalability refers to the ability of a system to be scaled to a variety of different sizes to meet the needs of different users. For example, while a full blown system may have 1024 processors it is desirable to make scaled down versions available with 512 processors, 256 processors or some other configuration. It is important that the basic building blocks which make up the biggest system can be used without modification to create the smallest, and vice versa. A scalable system is therefore far more flexible and such systems can be expanded to meet a users changing needs.

Therefore, there is a need in the art for a processor to memory interconnect network which, among other things, allows the processors to issue memory references without contention, which reduces contention among memory references in the network, which reduces the amount of time any one reference spends in the network, resulting in decreased processor idle time and increased system performance. There is also a need for a modular interconnect network that is easily scalable to fit multiprocessing systems having any number of processors and differently sized memories without the need for redesign of the individual modules which make up the interconnect network.

SUMMARY

To overcome limitations in the art described above and to overcome other limitations that will become apparent upon reading and understanding the present specification, the present invention provides a scalable processor to memory interconnect network for multiprocessing systems. The interconnect network is suitable for use with systems configured with varying numbers of processors and varying memory sizes; the modular nature of the interconnect network permits the construction of any scale system by simple replication.

The interconnect network includes network modules and memory modules. The network and memory modules are constructed of a series of nxm switches, each of which route one of n inputs to one of m outputs. The switches are designed such that message contention in the interconnect network is reduced. The switches, and thus the memory and network modules are highly modular, thus allowing virtually any scale multiprocessing system to be constructed utilizing the same components.

Mechanisms for reducing message contention and the number of interconnects required to implement the interconnect network are also provided. Finally, a sanity code is used to determine whether data on a particular path in the interconnect network is valid. The sanity code is also used to detect memory bank or network path failures or to downgrade a system.

BRIEF DESCRIPTION OF THE DRAWINGS

In the drawings, where like numerals refer to like elements throughout the several views;

FIG. 1 shows a block diagram of an exemplary four CPU multiprocessing system;

FIG. 2 is a more detailed block diagram of the four CPU multiprocessing system of FIG. 1;

FIG. 6 shows a block diagram of a memory module;

FIG. 12 shows detail of the control circuitry for the READY/RESUME handshake;

FIGS. 14–15 are tables showing various configurations of several exemplary multiprocessing systems which are possible using the present interconnect network.

DETAILED DESCRIPTION OF THE PREFERRED EMBODIMENT

In the following detailed description of the preferred embodiment, reference is made to the accompanying drawings which form a part hereof, and in which is shown by way of illustration a specific embodiment in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Referring now to FIG. 1, a simplified block diagram of an exemplary multiprocessing system is shown. FIG. 1 shows four CPUs 100 interfaced to a common memory 602 comprised of four memory modules 600a–d. FIG. 2 shows a more detailed block diagram of the system of FIG. 1. Each of the four CPUs 100a–d has two ports, port 0 and port 1. Each port 0 and 1 is routed to one of four memory modules 600a–d, for a total of eight outputs per CPU, and eight inputs per memory module.

Figure 3:
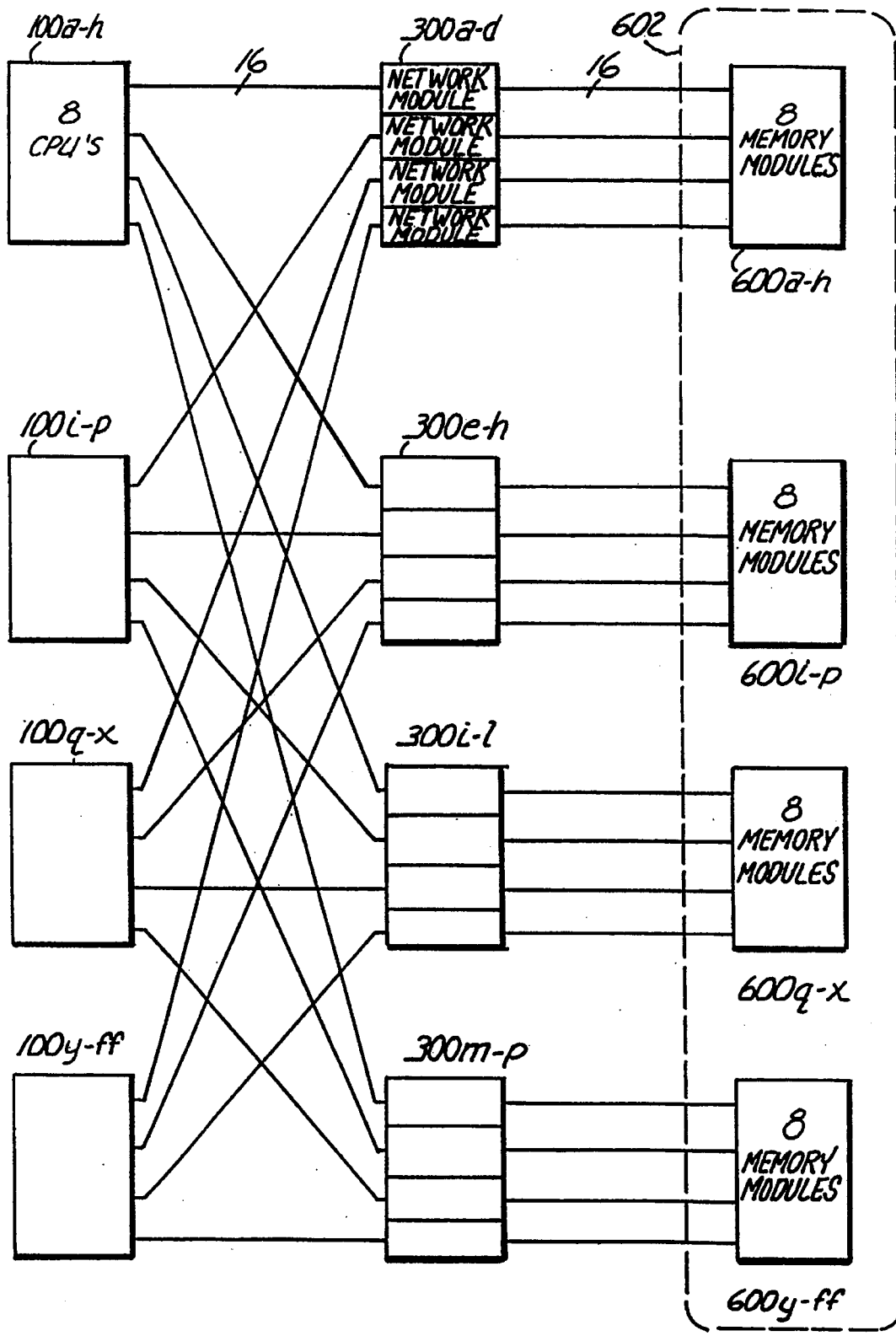
FIG. 3 shows a block diagram of an exemplary thirty-two CPU multiprocessing system.

An alternate exemplary multiprocessing system is shown in FIG. 3. FIG. 3 shows a full 32 CPU system. Four groups of eight CPUs 100a–h, 100i–p, 100q–x and 100y–ff are connected to four groups of eight memory modules 600a–h, 600i–p, 600q–x and 600y–ff via four groups of four network modules 300a–d, 300e–h, 300i–l and 300m–p. Exemplary four, eight and 32 CPU systems which can be constructed using the present processor to memory interconnect network will be described in more detail below.

FIGS. 1–3 illustrate how the modularity of architecture in the network modules 300 and memory modules 600 permits construction of any scale of multiprocessing system by simple replication. For systems having 1–4 CPUs, the CPUs connect directly to the memory modules 600 as shown in FIGS. 1 and 2. For systems having greater than 4 CPUs, the CPUs are first connected to the network modules 300 which are, in turn, connected to memory modules 600. The same network and memory modules which comprise the smallest multiprocessing system are used without modification to construct the largest. Those skilled in the art will readily recognize that because the modularity and expansibility is inherent in the design of the present interconnect network they are independent of the technology chosen for implementation, are extremely flexible and result in multiprocessing systems which are easily scaled.

Before describing the exemplary four, eight and thirty-two CPU multiprocessing systems, the memory modules 600 and network modules 300 which make up the memory interconnect network will be described in detail. In general, the memory modules 600 and network modules 300 are comprised of a set of n×m switches. These n×m switches are connected in various configurations to form the memory and network modules, which route messages between the processors and the common memory. The switches are implemented such that the same group of n×m switches are used repeatedly to construct the interconnect network. The resulting structure is therefore highly modular, such that the same pieces used to construct a small scale multiprocessing system are also used to connect the largest.

Memory Module

A detailed description of a memory module 600 will now be given. FIG. 6 shows a block diagram of a memory module 600. Both the outgoing path 604 and the return path 606 are shown. Each memory module 600 has eight inputs 0–7 and sixteen memory banks 640a–640p. For ease of implementation, the memory modules are logically separated into two independent halves. Inputs 0–3 are routed to memory banks 640a–640h (top half), while inputs 4–7 are routed to memory banks 640i–640p (bottom half). The two halves are completely separate and do not interact. Physically, the two halves are preferably located on top and bottom sides of a singe printed circuit board. It shall be understood, however, that the present interconnect network is not in any way limited by this physical implementation; many other particular physical implementations shall be easily recognized by those of skill in the art.

Each input 0–7 is first buffered through a 1×1 switch 610. Two groups of four 1×1 switches 610 are input to one of two 4×4 switches 620. 4×4 switches 620 routes each of the four inputs to one of four 1×2 switches 630. Each 1×2 switch 630 routes one input to one of two memory banks 640.

On the return path 606 of each memory module 600, two memory banks are routed to a 2×1 switch 650. Four 2×1 switches 650 are input to a 4×4 switch 660, which are then routed to one of four 1×1 switches 670 for a total of eight outputs 0–7.

Figure 7A:
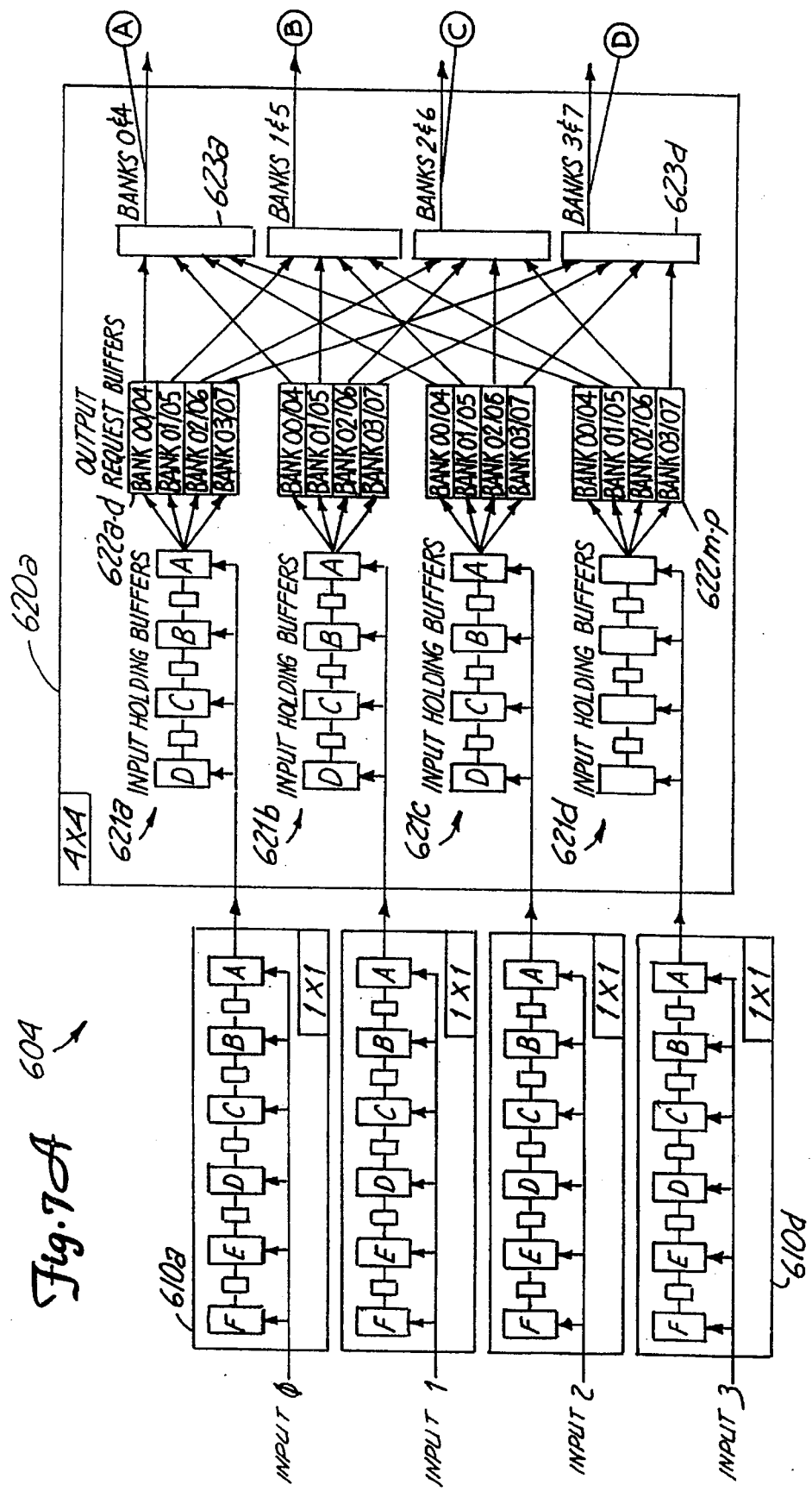
FIG. 7 shows a more detailed block diagram of the outgoing path of the memory module of FIG. 6.
Figure 7C:
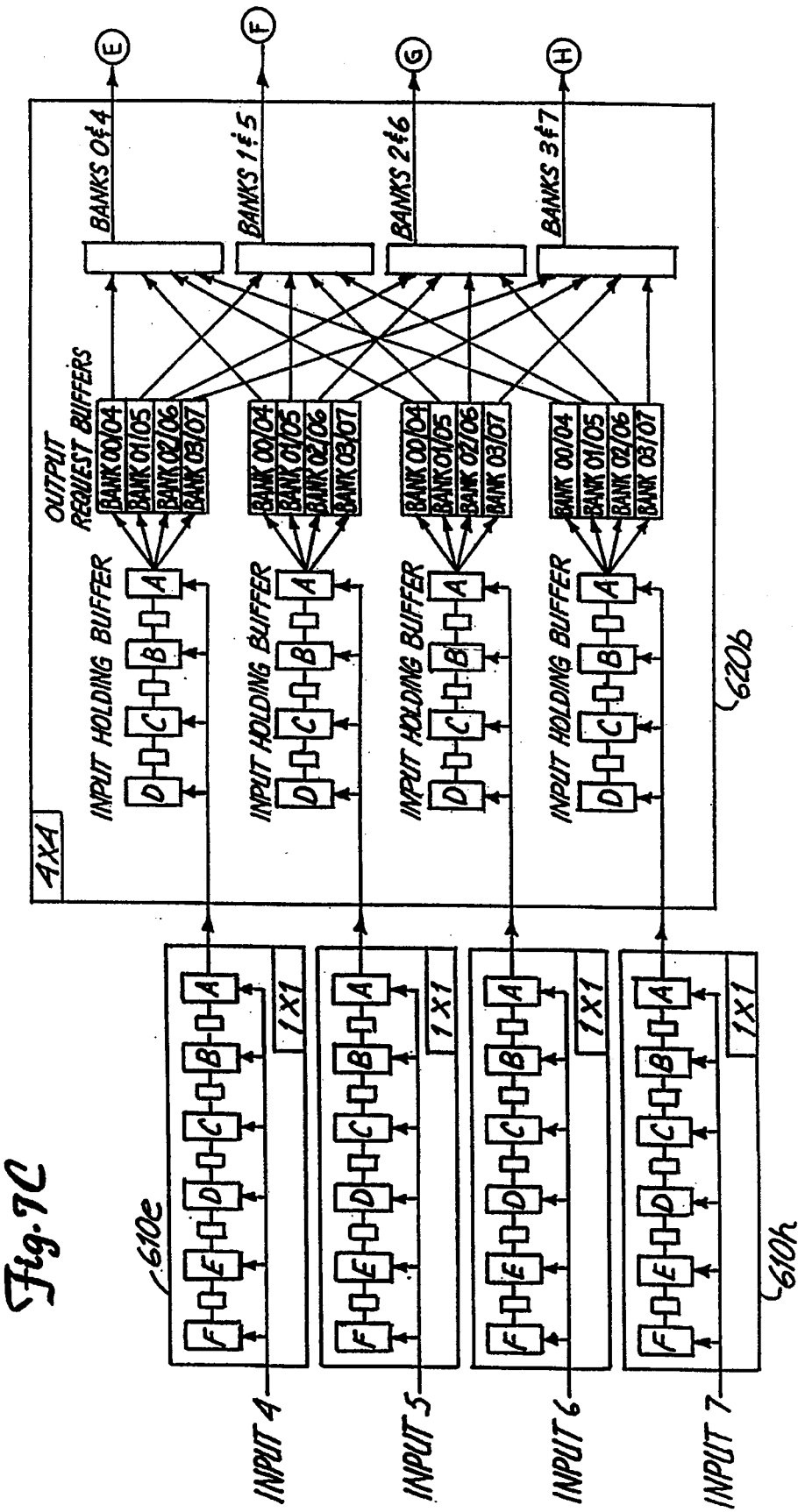
Figure 7D:
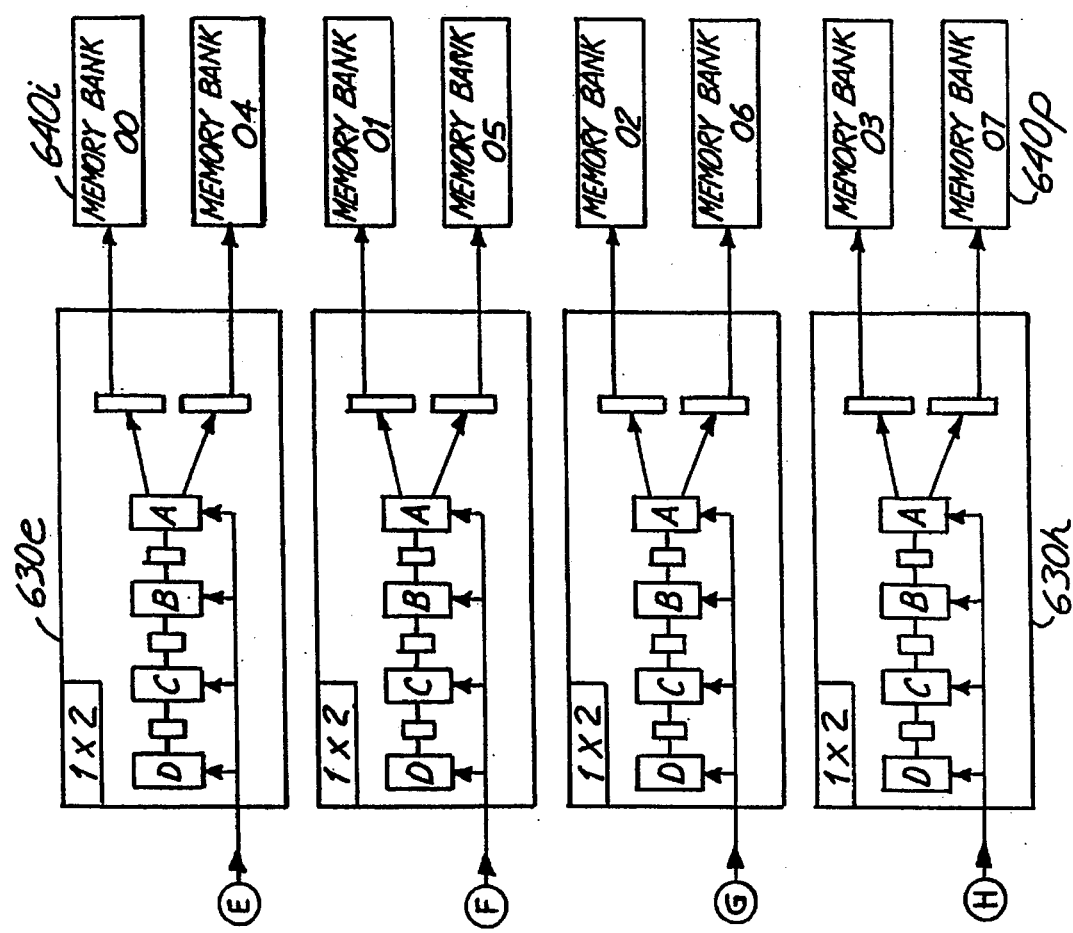

FIG. 7 shows a more detailed block diagram of the outgoing side 604 of a memory module 600. Both the top and bottom halves are shown. Each of the inputs 0–7 of memory module 600 includes a 1×1 switch 610 which buffers the memory references from the CPUs 100 to the memory module. The number of buffers in each 1×1 switch 610 is variable depending on the round trip time for communication between crossbar switches. As each clock period is added to the communication time, an additional buffering in each 1×1 switch 610 is needed. The purpose of the 1×1 switch 610 is to cover the communication time between crossbar switches so that multiple message packets can be sent. Therefore, in the present memory module shown in FIG. 7, where the n×m switches communicate in one clock period, there are six FIFO buffers A–F.

The buffers A–F in 1×1 switch 610, and the buffers in all n×m switches used to construct the present interconnect network, comprise a first-in, first-out (FIFO) queue structure. A message entering memory module 600 through one of the inputs 0–7 is first latched the corresponding buffer A for that path if it does not already contain another message. If buffer A is occupied, the message is instead latched into buffer B if that buffer is available. Once buffer A is empty, messages contained in buffer B are shifted into buffer A. If both buffer B and buffer A are full when another message attempts access, that message will enter buffer C. Thus input buffer acts as a first-in-first-out queue. If buffers A–F are all full when another message attempts to enter the input buffer 610, it simply waits until one of the FIFO buffers is free before entering the memory module. When input holding buffer 621 is ready to receive another message, the message in buffer A of 1×1 switch 610 is latched into input holding buffer 621 of 4×4 switch 620.

Once a message is latched into input holding buffer 621, buffer A of buffer 621 decodes two message steering bits to determine which of four output request buffers 610 the message is to be routed to. After it decodes the two message steering bits, buffer A replaces the two message steering bits in the first packet with two bits representing from which of the eight inputs 0–7 the message entered memory module 600. In this manner, a return address back to the originating CPU is built in the message steering bits as a message travels through the successive layers of the memory module on its way to memory banks 640. After the data is retrieved from the appropriate memory bank, the processor return address information is available in the message steering bits to guide the retrieved data back to the originating processor. Similarly, for return messages, a return address indicating from which memory bank the reference came is available in the message steering bits once the message gets back to the processor. In this way, if there was an error in the data, the processor knows which memory bank the erroneous message came from, thus helping to pinpoint where the error occurred.

This bit replacing scheme reduces system interconnects and message length as it eliminates the necessity of sending the processor return address along with the message. Instead, the bit replacing scheme of the preferred embodiment of the present invention simply uses the same bits and interconnects to steer messages on the outgoing path to automatically generate the processor or memory bank return address.

The message steering bits as decoded in buffer A of input holding buffers 621 determine which of the four output request buffers 622a–d a message goes to after leaving input holding buffer A. The purpose of output request buffers 622 is to reduce message contention and blocking in the interconnect network. For example, if group buffer 623a is full, a message waiting in output request buffer 622a will be blocked, containing a message waiting for the path to clear. However, when another message headed for a different group buffer 623b, *c* or *d* enters memory module 600 on input 0, for example, that message is able move into the appropriate output request buffer 622 without being blocked by the message waiting for group buffer 623a. Thus, if an additional message destined for any other group buffer 623 enters input path 0, that message will not be blocked from access to its group buffer 623, because it simply moves into the appropriate output request buffer 622. In this manner more messages can "get around" blocks in the crossbar network. Only if a particular path through the interconnect network is blocked all the way to through the 1×1 switch 610 will messages entering on that path be completely blocked from all output paths. If output request buffers 610 in 4×4 switch 620 were not there, all four outputs would be blocked. Through the use of output request buffers 622, only 1 of 4 output paths is blocked. Those skilled in the art will readily recognize and appreciate that output request buffers greatly reduce the possibility of message contention and blocking in each n×m switch and in the network and memory modules themselves.

After a message has entered one of the output request buffers 622, the message becomes eligible to be steered to the appropriate group buffer 623a–d. Each group buffer 623 looks for messages from the corresponding output request buffers 622 from each input path. For example, group buffer 623a looks for eligible messages from output request buffers 622a, 622e, 622i and 622m, which entered 4×4 switch 620 from inputs 0, 1, 2 and 3, respectively. If there is only one eligible message in the appropriate output request buffer 622, the group buffers 623 simply transmits that message to the corresponding 1×2 switch 630. In the preferred embodiment, if there is more than one eligible message in the appropriate output request buffers 622, group buffer 623 transmits the next message in round robin order from the last output request buffer selected. For example, if group buffer 623a selects output request buffer 622b for transmission, it would next select output request buffer 622c for transmission if 622c had an eligible message and more than one eligible message were present.

Once a message travels through a group buffer 623 of 4×4 switch 620, the message proceeds on to the respective 1×2 switch 630. In the preferred embodiment, messages entering 1×2 switch 630 are routed to one of two memory banks 640.

After a message has entered buffer A of 1×2 switch 630, buffer A decodes message steering bits and steers the message to one of two bank input buffers 632a or 632b. Each bank input buffer 632 is associated with a different memory bank 640. For example, a message entering 1×2 switch 630a to be routed to memory bank 04 would be steered to bank input buffer 632b. At this level, messages become eligible to be selected by bank control logic chips to access the appropriate memory chips.

Figure 8C:
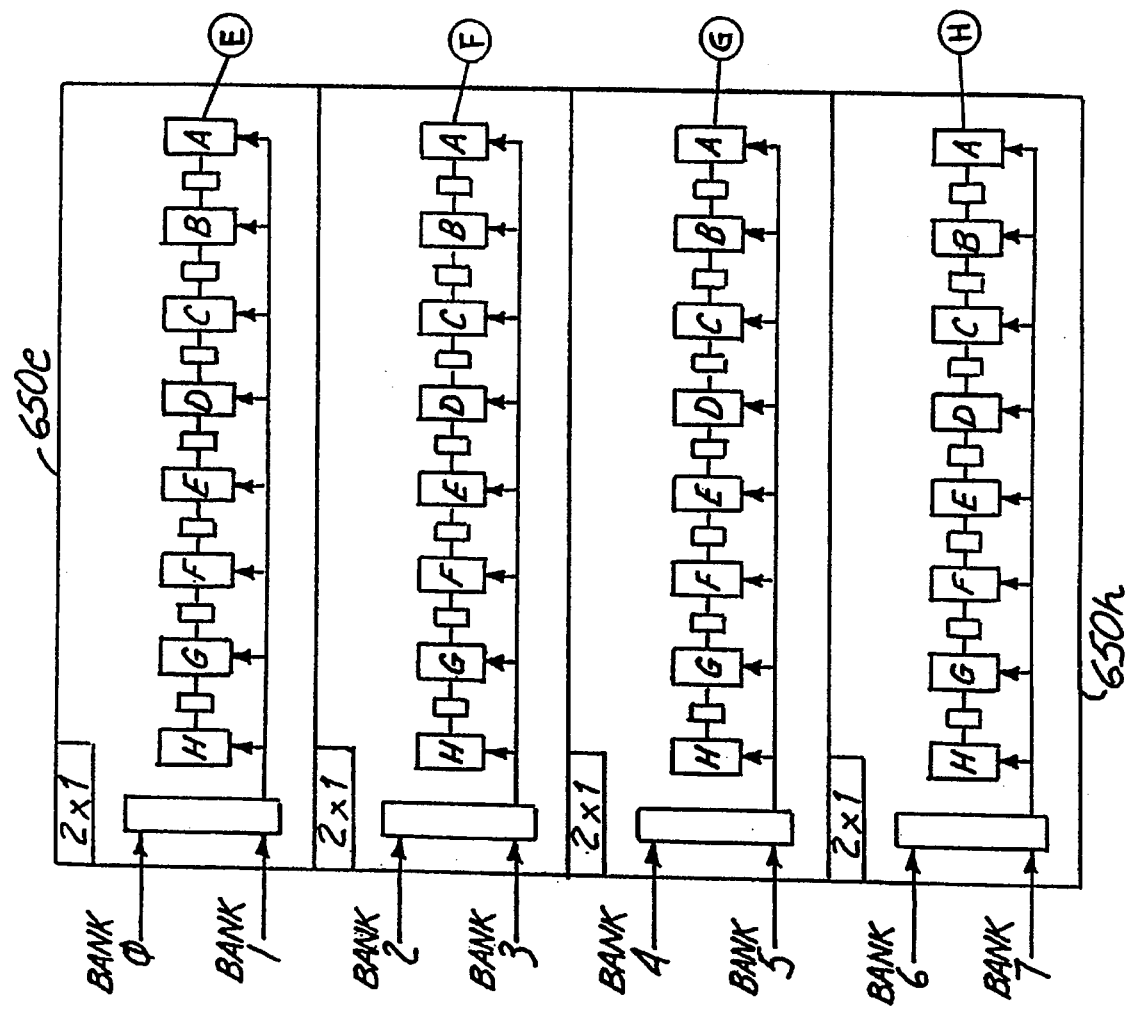
FIG. 8 shows a more detailed block diagram of the return path of the memory module of FIG. 6.
Figure 8D:
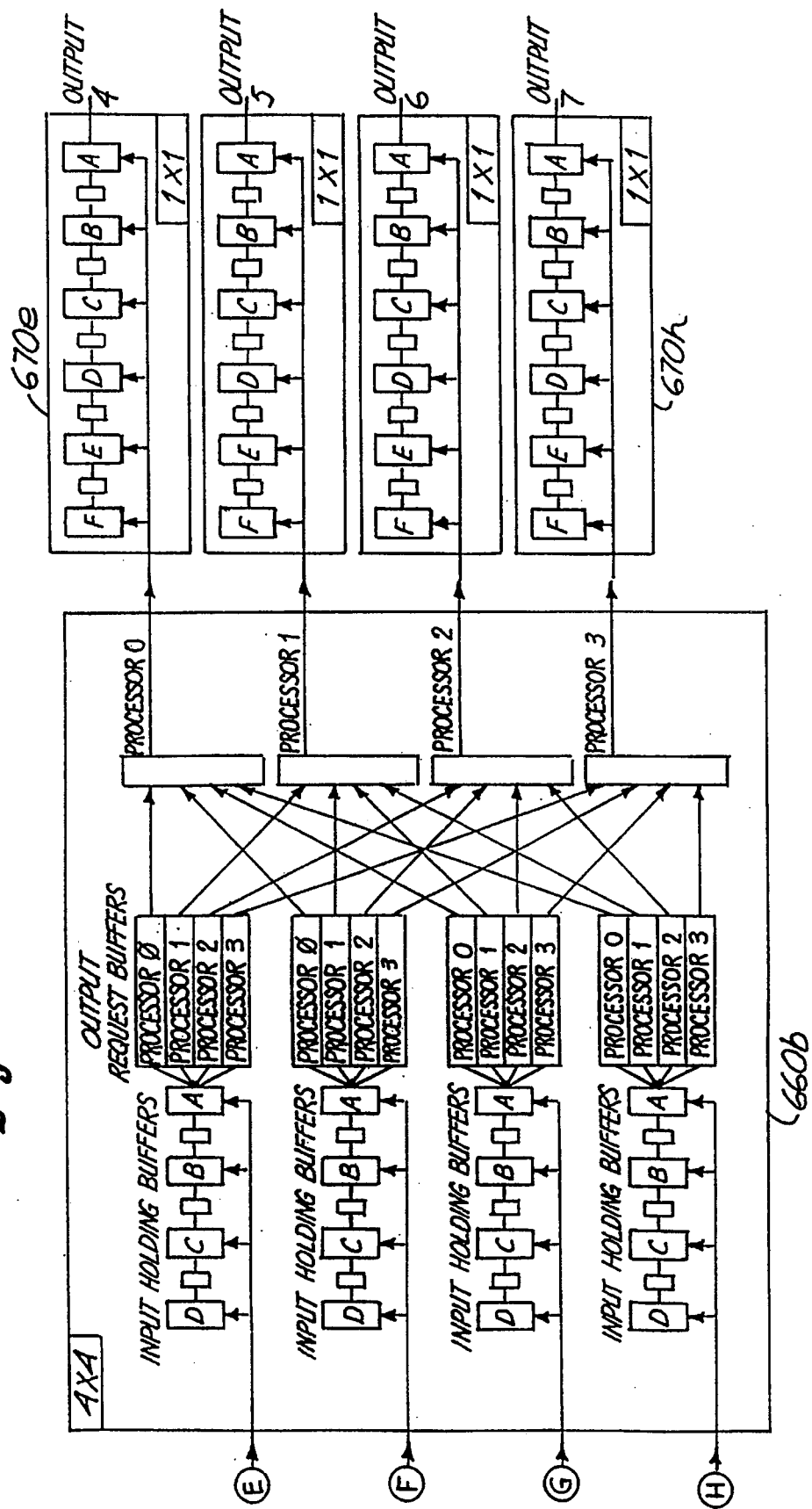

To go from memory module 600 back to the requesting CPU, the reference simply goes back out of the memory bank and through the appropriate return side 606 of the memory module 600 back to the originating processor in a manner similarly to the way an outgoing processor-to-memory reference travels through the outgoing side 604 of the memory module, as described above. The return side 606 of the memory module 600 is shown in detail in FIG. 8. Again, both the top and bottom halves are shown. After leaving a memory bank 616, a return reference enters a 2×1 switch 650. Each 2×1 switch 650 has an eight buffer FIFO 652. The FIFO on this switch must be eight deep in order to deal with the possibility of a pipelined memory part (as discussed in more detail below). Each 2×1 switch 650 receives messages from two corresponding memory banks, buffers the messages through an eight buffer FIFO and routes, them to an input of 4×4 switch 660. 4×4 switch 660 operates identically to 4×4 switch 620 described and shown above with respect to FIG. 5. From 4×4 switch 660 the return messages are routed to the appropriate 1×1 output buffer 670. 1×1 output buffer 670 operates identically to 1×1 switch 610 described and shown above with respect to FIG. 5. The return messages leave memory module 600 on the corresponding output 0–7.

Network Module

Figure 9B:
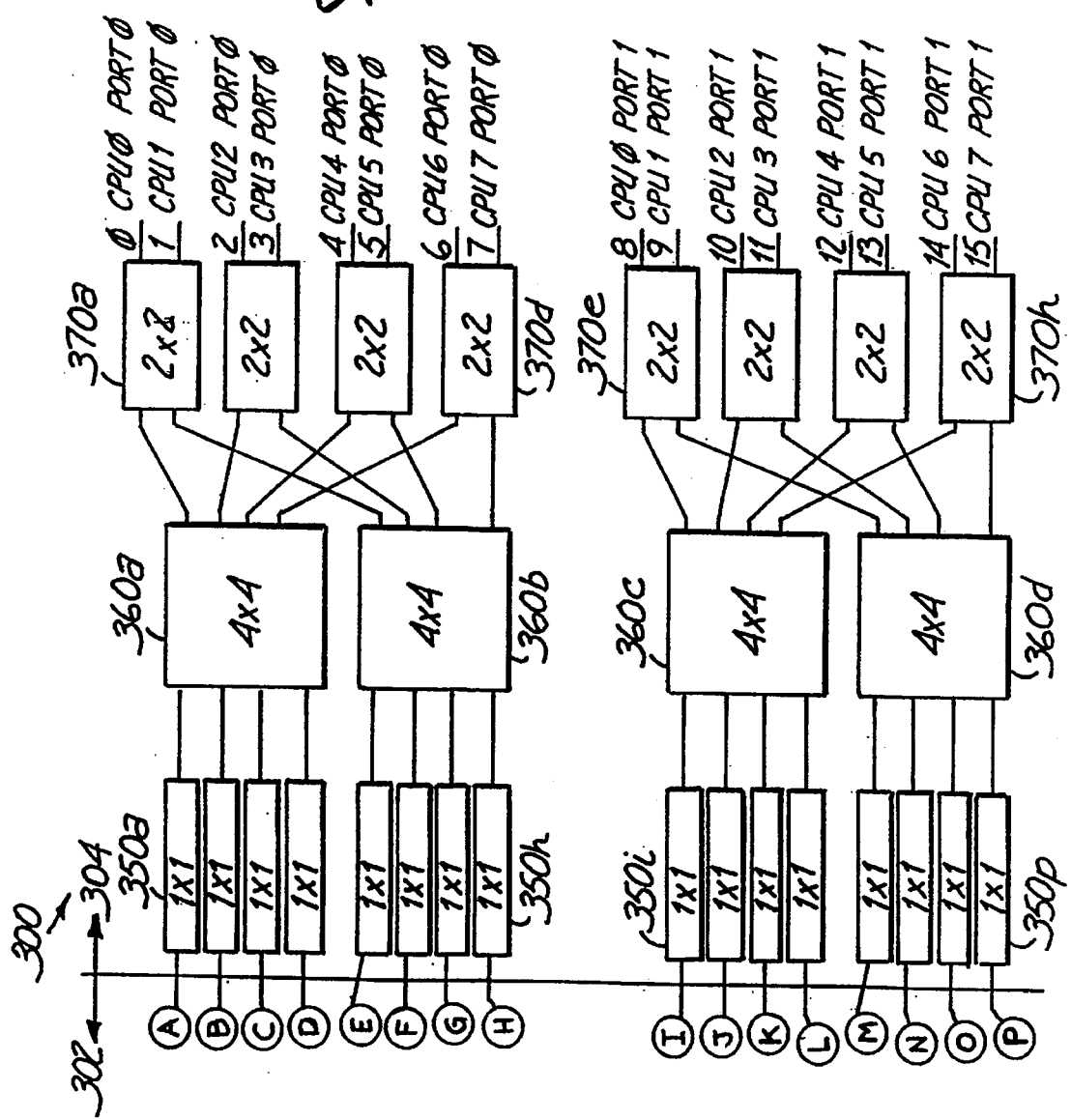
FIG. 9 shows a block diagram of a network module.

FIG. 9 shows a block diagram of a network module 300. Each network module has sixteen inputs 0–15 and sixteen outputs 0–15. For ease of implementation, each network module is logically separated into two halves. Inputs 0–7 are routed to memory modules 600a–h (top half), and inputs 8–15 are routed to memory modules 600i–p (bottom half). As described above with respect to the memory modules, the two halves are separate and do not interact, and are preferably physically implemented on top and bottom sides of a printed circuit board. It shall be understood, however that the present interconnect network is not limited to the physical implementation described herein, and that many other possible physical implementations will be readily apparent to those of skill in the art.

Each of the eight processors connected to a particular network module (see FIG. 3) has two ports to memory, which are input to network module 300 via sixteen 1×1 switches 310a–p. For example, the two ports for CPU 0 connect through 1×1 switch 310a and 1×1 switch 310i. Each 1×1 switch 310 then connects to one of four 4×4 switches 320a–d. Each 4×4 switch 320 then routes each of the four inputs to one of four outputs, consisting of eight 2×2 switches 330a–h. Each of the eight 2×2 switches 330a–h then has an input to one of sixteen memory modules 600a–p.

The return path 304 of a network module 300 consists of these same switches as on the outgoing path 302. Each of sixteen 1×1 switches 350a–350p connect to one of the sixteen memory modules 600a–p. 1×1 switches 350 operate identically to and are of the same structures as 1×1 switches 310a, and as 1×1 switches 610 and 670 are discussed above with respect to FIGS. 6–8. 4×4 switches 360a–d each receive inputs from groups of four 1×1 switches 350, and routes each of the four inputs to one of four 2×2 switches 370. 4×4 switch 360 operates identically to 4×4 switch 320 on the input side 302 of the network module 300. Similarly, 2×2 switches 370 operate identically to 2×2 switches 330 on the input side of network module 300. Each output from a 2×2 switch are one of connected to two of the eight processors 100a–h. Thus, port 0 of CPU 100a connects to 2×2 switch 370a and port one of CPU 100a connects to 2×2 switch 370e as shown in FIG. 9.

Figure 10A:
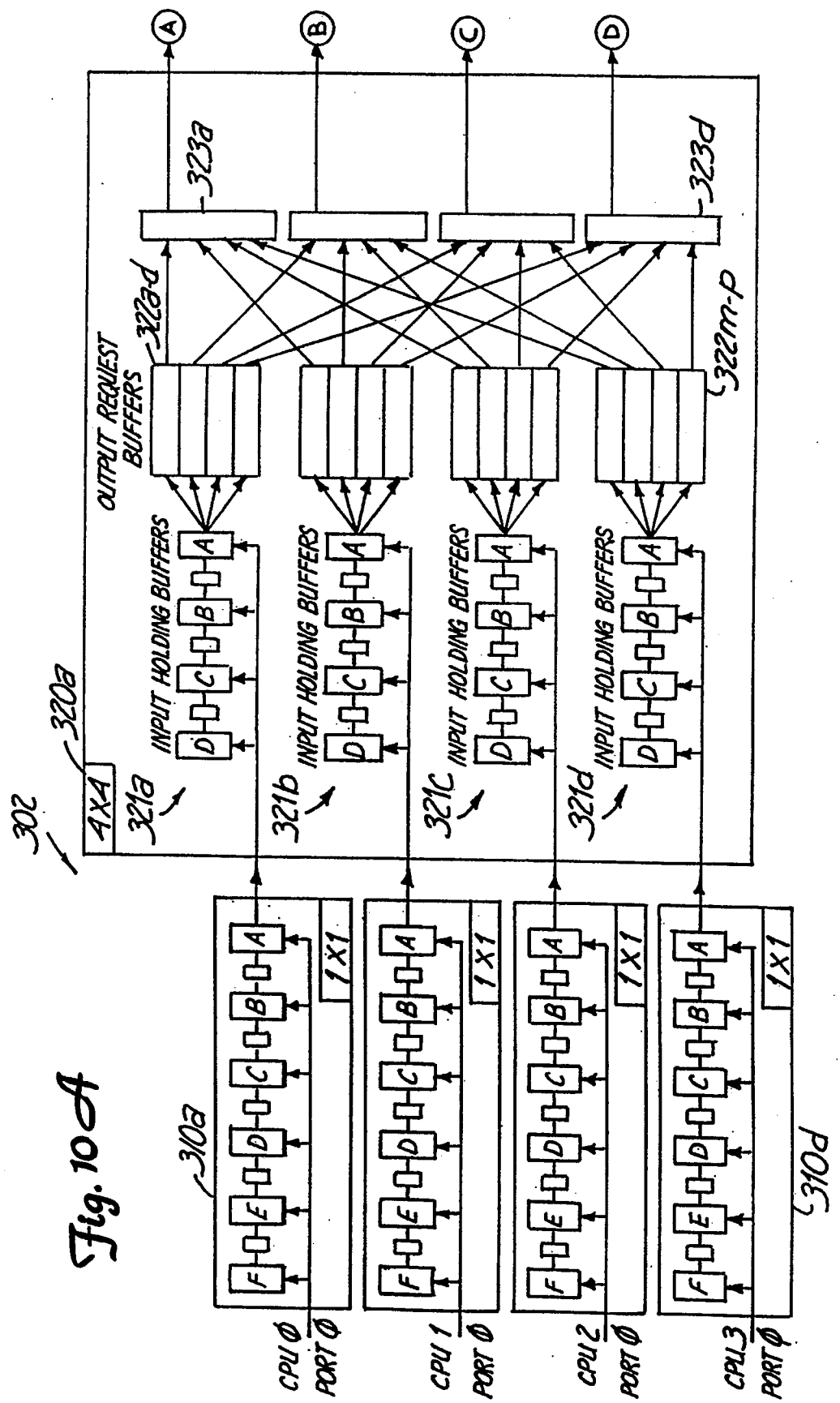
FIG. 10 shows a more detailed block diagram of the outgoing path of the network module of FIG. 9.
Figure 10C:
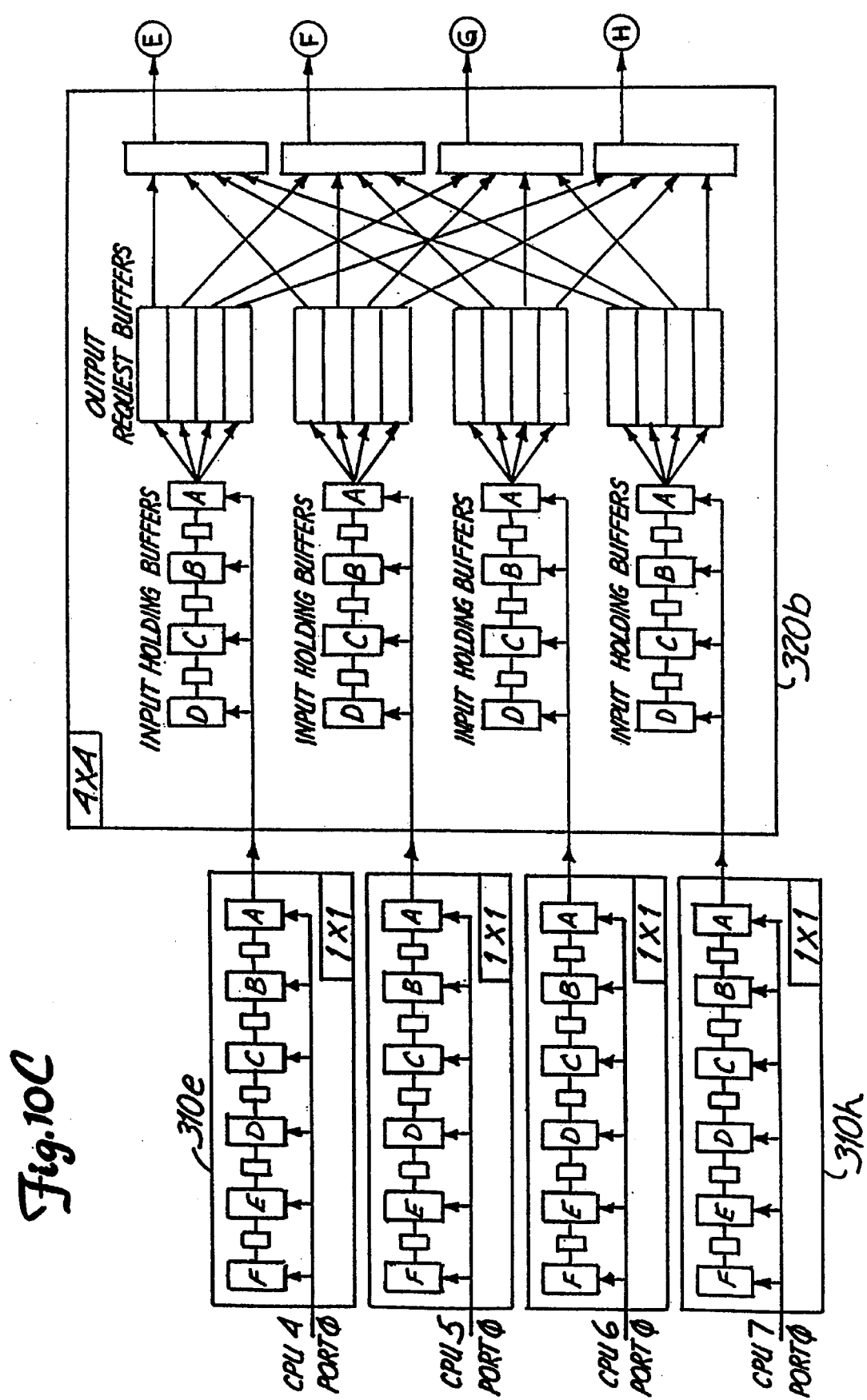
Figure 10D:
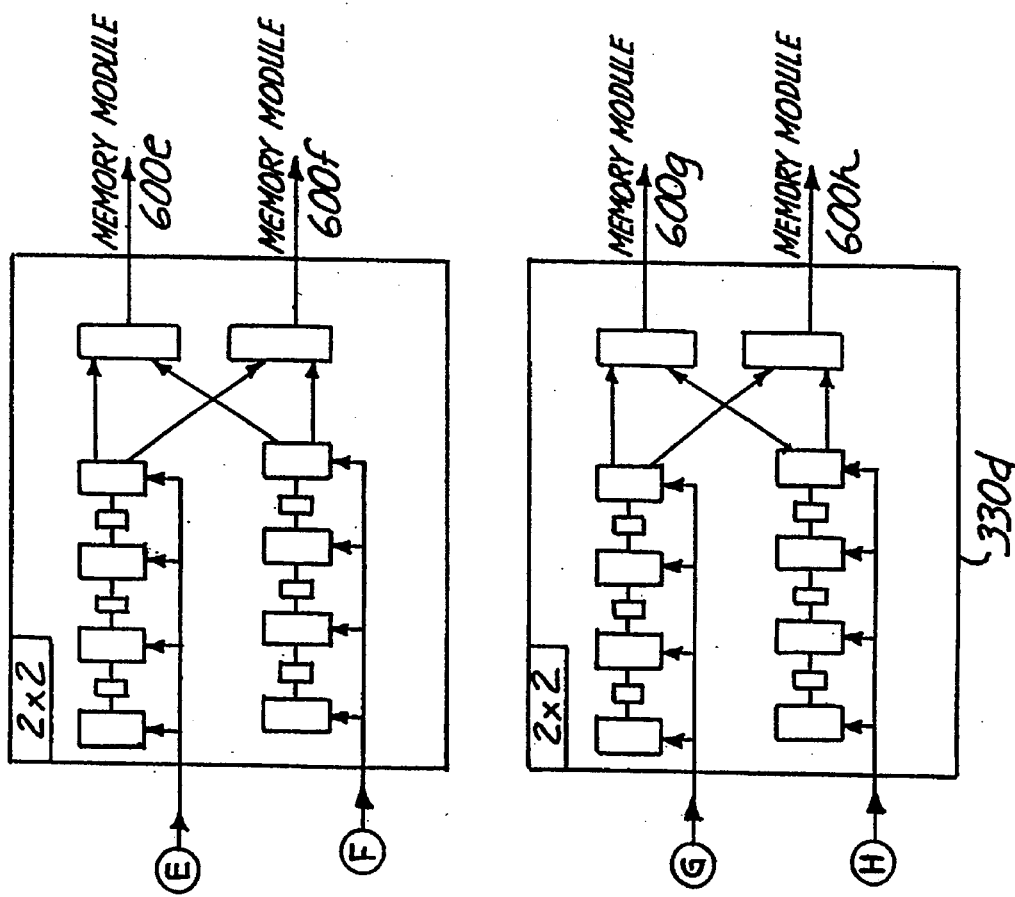

FIG. 10 shows a more detailed block diagram of the outgoing path 302 of a network module 300. It shall be understood that FIG. 10 shows only the top half of the outgoing path, i.e., inputs 310a–310h are shown, but 310i–310p are not. However, it shall also be understood that the bottom half of the network module not shown in FIG. 10 operates identically to that shown and described with respect to FIGS. 10 and 11. FIG. 10 shows the internal structure of each of 1×1 switches 310, 4×4 switches 320, and 2×2 switches 330. From the detail shown in FIG. 10 it shall be understood that 1×1 switch 310 operates identically to and is of the same structure as 1×1 switch 610a and 1×1 switch 670 shown and described above with respect to FIGS. 6–8. It shall also be understood that 4×4 switch 320 operates identically to and is of the same structure as 4×4 switches 660 and 620 shown and described above with respect to FIGS. 6–8.

Each of the four outputs from the two 4×4 switches 320a and 320b are routed to one of four 2×2 switches 330a–d. 2×2 switches 330 each include two four buffer FIFO's 331a and b, each of which route messages to are of two module buffers 332a and b. Buffer A in FIFO 331 decodes the message steering bits to route the message to the appropriate module buffer 332, each which is an input to one of the memory modules.

Figure 11C:
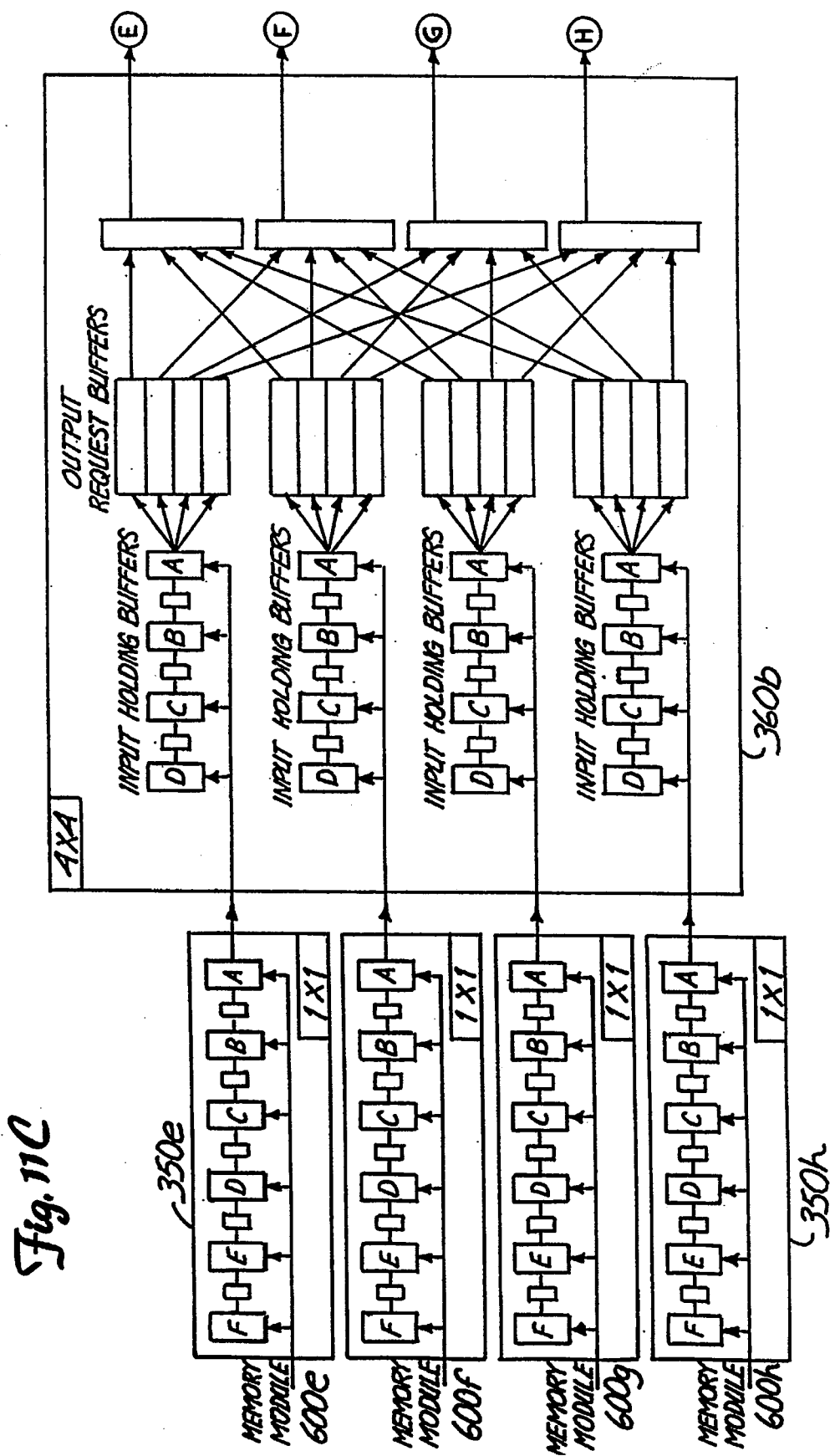
FIG. 11 shows a more detailed block diagram of the return path of the network module of FIG. 9.
Figure 11D:
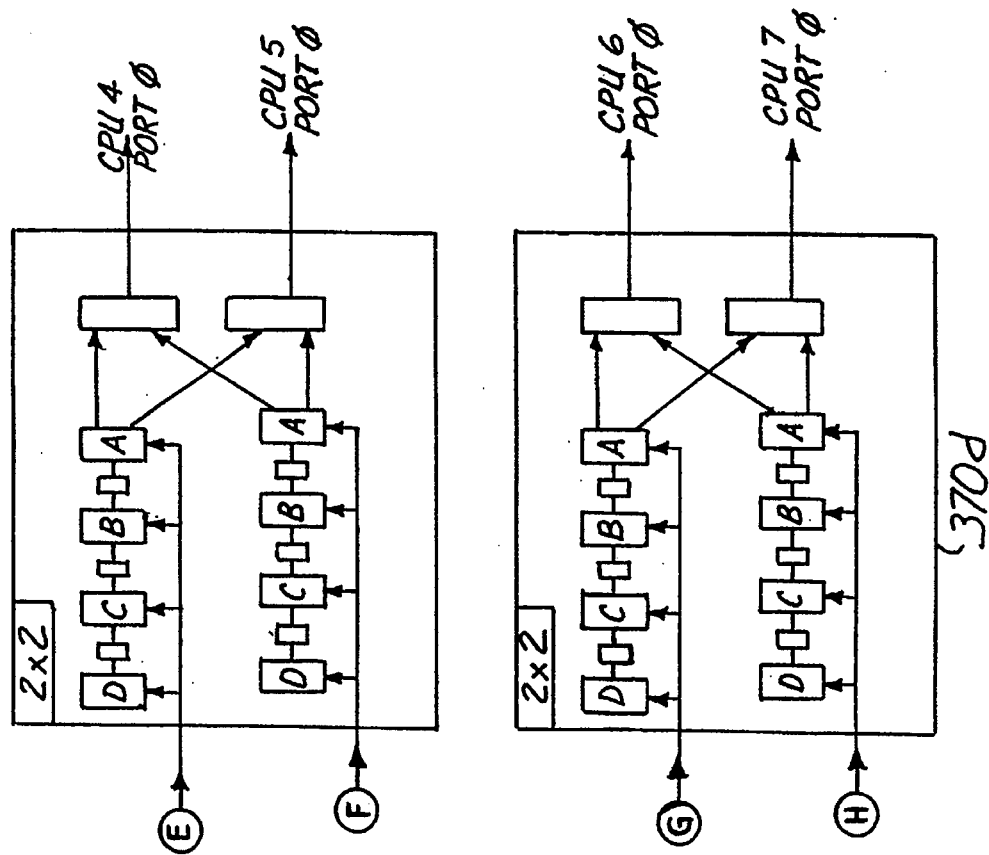

FIG. 11 shows the return path 304 through a network module 300. In the same manner as FIG. 10, it shall be understood that FIG. 11 shows only the top half of the return path 304 of a network module 300. From the detail shown in FIG. 11, it shall be understood that 1×1 switch 350 operates identically and is of the same structure as 1×1 switch 310 shown in FIG. 10, 1×1 switch 610 shown in FIG. 7 and 1×1 switch 670 shown in FIG. 8. Similarly, it shall also be understood that 4×4 switch 360 operates identically to and is of the same structure as 4×4 switch 320 of FIG. 10, 4×4 switch 660 shown in FIG. 8 and 4×4 switch 620 shown in FIG. 7. Finally, it shall also be understood that 2×2 switch 370 operates identically to and is of the same structure as 2×2 switch 330 shown and described above with respect to FIG. 10.

Detailed Description of Exemplary Multiprocessing Systems

The modularity of the design of the memory modules 600 and network modules 300 will be readily apparent to those of skill in the art from the above description. The same n×m switches which comprise the smallest multiprocessing system can be used without modification to construct the largest. Those skilled in the art will therefore readily recognize and appreciate that because the modularity and expansibility are inherent in the design implementation of the present network and memory modules, they are independent of the technology chosen for implementation and also enable an extremely flexible and easily scaled system.

Three exemplary multiprocessing systems which can be constructed using the interconnect network of the present invention will now be described in detail.

Referring again to FIG. 1, a four CPU multiprocessing system is shown. FIG. 2 shows more detail of how each of the eight outputs 0–7 from each CPU 100 is routed to the common memory 602. The connections shown in FIG. 2 allow each CPU to access every memory bank in common memory 602. For example, FIG. 2 shows that ports 0 and 1 of CPU 100a connect to inputs 0 and 4 respectively of memory module 600a. FIG. 6 shows that input 0 has access to memory banks 640a–h and input 4 has access to memory banks 640i–p. Thus, each memory bank is mapped to either port 0 or port 1 of each CPU 100. Ports 0 and 1 of CPU 100a are also connected similarly to memory modules 600b–d. CPU's 100b–d are similarly connected to each memory module 600 such that each CPU has access to all of the memory banks 640 common memory 602.

Figure 4:
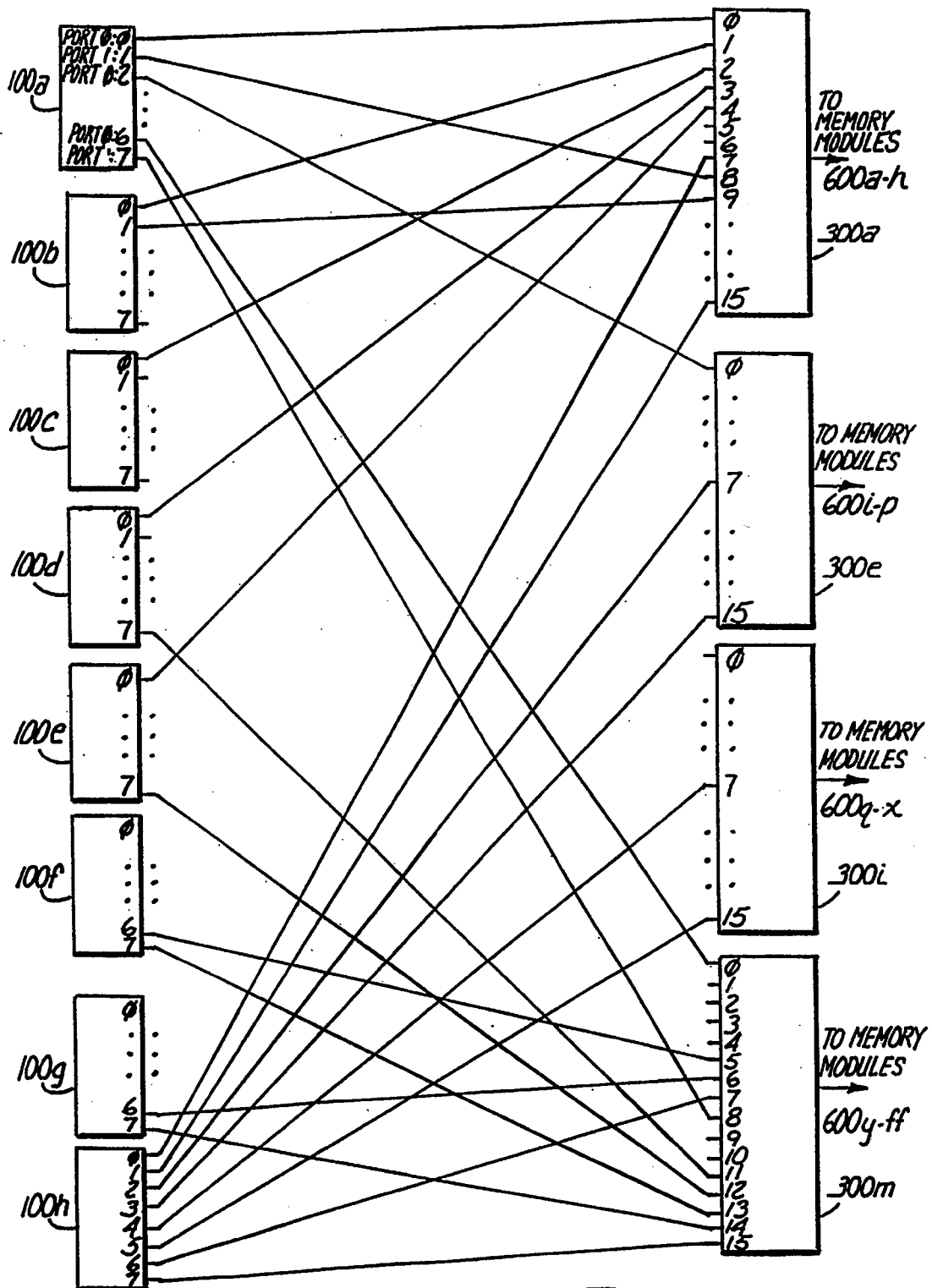
FIG. 4 shows a more detailed block diagram of the connections between eight CPUs and four network modules of the thirty two CPU system of FIG. 3.

Referring now to FIG. 3, a 32 CPU multiprocessing system is shown. Detail of the connections between the 32 CPU's 100a–ff and the network modules 300a–p is shown in more detail in FIG. 4. FIG. 4 shows eight CPU's 100a–h and the associated interconnections between network modules 300a, 300e, 300i, and 300m. CPUs 100a–ff are connected to network modules 300 such that each CPU has access to each memory bank of the memory modules 600. Thus port 0 of CPU 100a connects to input 0 of network module 300a input 0 of network module 300e, input 0 of network module 300i and input 0 of network module 300m. As shown in FIG. 9, port 0 of CPU 100a has access to memory modules 600a–h via input 0, and port 1 of CPU 100a has access to memory modules 600i–p via input 8, of network module 300. The remaining processors in the 32 CPU system shown in FIG. 3 are connected similarly such that each has a path to all memory banks in common memory 602.

Figure 5:
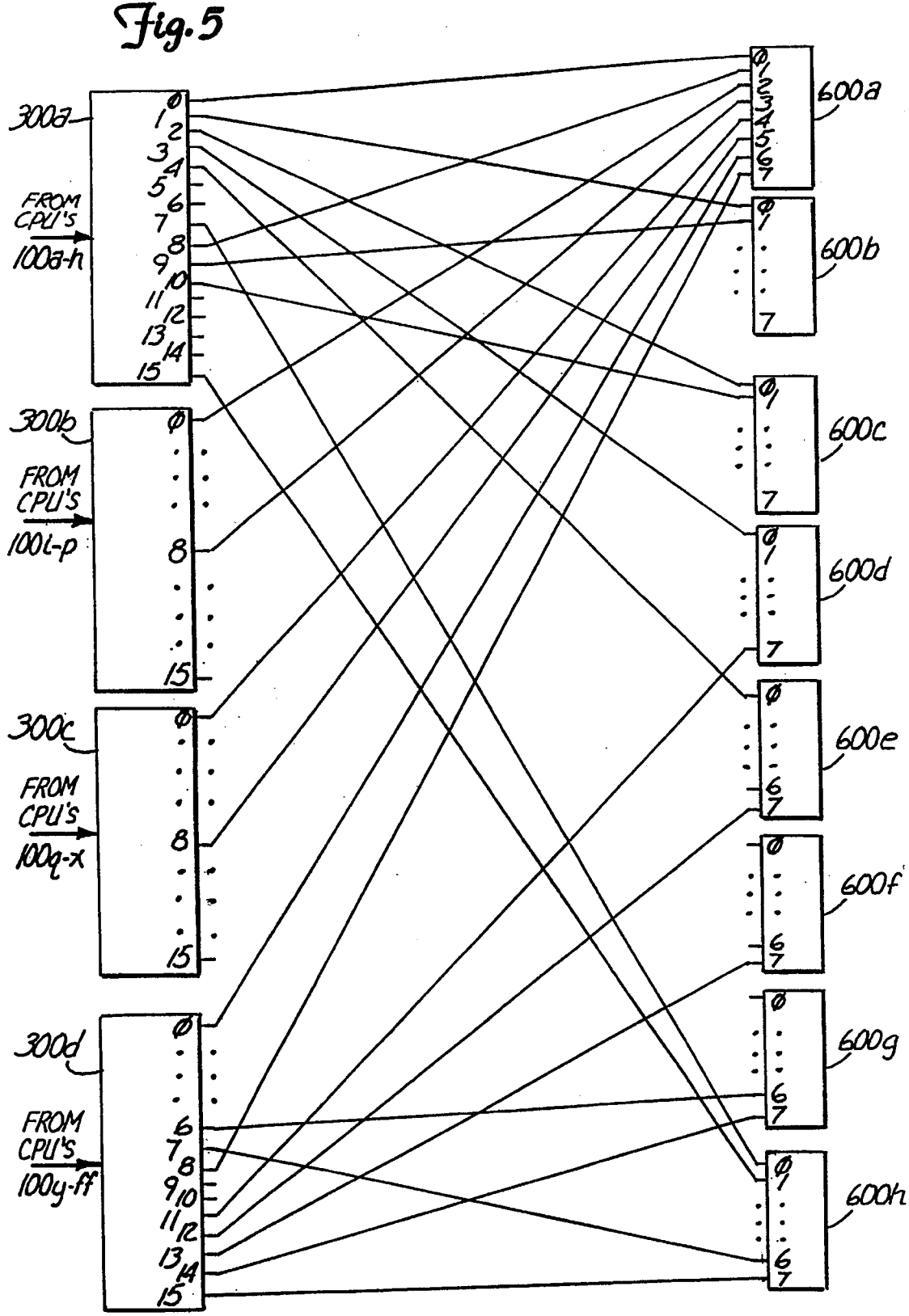
FIG. 5 shows a more detailed block diagram of the connections between four network modules and eight memory modules of the thirty-two CPU system of FIG. 3.

FIG. 5 shows more detail of the connection between network modules 300a–d and memory modules 600a–h of the exemplary 32 CPU system shown in FIG. 3. Each memory module 600a–h connects to two outputs of each of the four network modules 300a–d. The network and memory modules are connected such that a reference from any of the 32 processors can reach any memory bank in common memory 602.

For example, to route a reference from CPU 100d to memory bank 640e of memory module 600h (see FIG. 3), port 0 of CPU 100d is routed to input 3 of network module 300a (see FIG. 4). From network module 300a, the message is routed out output 7 of network module 300a (shown in FIG. 5). This output connects to input 0 of memory module 600h. Referring now to FIG. 6, input 0 of each memory module 600 is routed to its respective bank 640e through 4×4 switch 620a, 1×2 switch 630c and finally to memory bank 640e. Referring again to FIG. 3, a reference from CPU 100q can be routed to memory module 600i via network module 300g, or between any CPU and memory bank following the appropriate path in the interconnect network similar to that described above.

A system having greater than four processors but less than 32 can be constructed using a variation of the thirty-two CPU system of FIG. 3. For example, an eight CPU system can be constructed with CPUs 100a–h interfaced to memory modules 600a–h via network module 300a. As shown in FIGS. 4 and 5 only outputs 0 and 1 of each CPU 100a–h are required to provide each port of each CPU in an eight CPU system a path to the eight memory modules 600a–h. Output 2–7 of each CPU are therefore invalid.

Network module 300a in the eight CPU multiprocessing system connects to each of the eight memory modules 600a–h as shown in FIG. 5. Because only one network module is required, only inputs 0 and 1 of each memory module are used. The remaining inputs are not connected and therefore any data in the remaining paths is invalid.

For systems such as the eight CPU eight memory module multiprocessing system described above, in which all CPU outputs are not used, a mechanism is provided to indicate whether data on each path through the interconnect network is valid. For those outputs which are not used, noise or other invalid information will be sent over a particular processor to memory path. Errors could occur should the memory banks interpret these invalid signal as instructions or data to be read or written to a memory location.

To ensure that valid data is on each signal line, each valid processor output sends a serial bit stream into the first switch of the interconnect network. This serial bit stream has a "sanity code" embedded therein to indicate whether data from that output is valid. The sanity code is a six bit pattern which is sent out serially and continuously to the first network switch interconnect by each valid processor output. Thus, for each CPU shown in FIG. 2, each valid CPU output sends the sanity code to the first switch of the respective memory module 600. For each CPU shown in FIG. 3, each valid CPU output sends the sanity code to the first switch of the respective network module 300. The purpose of the sanity code is to protect the interface between modules in the interconnect network. When a correct sanity code is received, the result is broadcast the sanity code to all eight outputs to which that input has access to. Thus, for example, in FIG. 7, if the CPU output in question connects to input 2 of memory module 600, 1×1 switch 610c checks for the correct sanity code, and if received, broadcasts it to the eight memory banks 640a–h which input 2 has access to.

Figure 13:
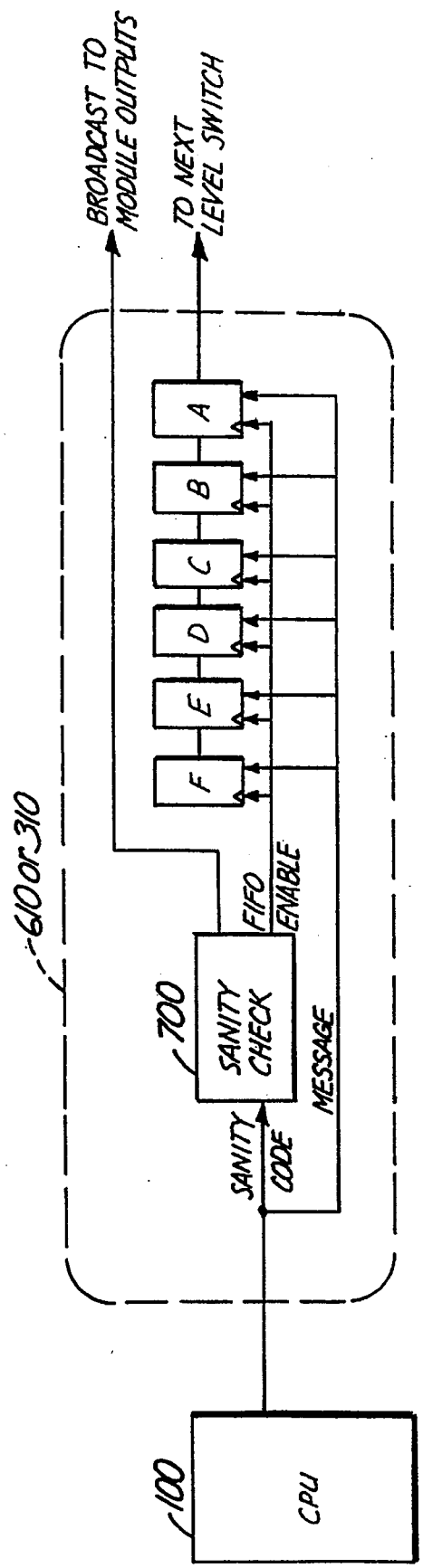
FIG. 13 shows detail of the control circuitry the sanity code.

The control circuitry for monitoring the sanity code is shown in FIG. 13. A sanity check circuit 700 in the first switch of each module, monitors the received sanity code to determine whether the data coming into that input of module is valid. For memory modules 600, there is a sanity check circuit 700 in each 1×1 switch 610a–h corresponding to each input 0–7. For network modules 300, there is a sanity check circuit 700 in each 1×1 switch 310a–p corresponding to each input 0–15.

The sanity check circuit 700 acts as an enable to the FIFO of the corresponding switch. If the sanity code is not correctly received, the FIFO in that switch will not be enabled and any information entering the switch will not be loaded into the FIFO buffers.

The sanity code must be chosen such that it is very unlikely that noise introduced by an invalid CPU output or by an unconnected input of a network or memory module will ever duplicate the sanity code. One exemplary appropriate six bit sanity code is therefor:

010011

As described above, this six bit code is sent out serially and continuously only by valid CPU outputs. A memory bank will only be enabled to pay attention to the data on a particular interconnect network path if the sanity check circuit determines that the six bit code is received serially sixteen times in a row. If at any time the proper sanity code is not received, the memory bank will ignore data on that path until the correct six bit code is again received serially sixteen times in a row.

The resulting 96 bit code (6 bit sanity code repeated sixteen times) is a signal having very distinct frequencies and signalling patterns embedded therein. These frequencies and signalling patterns are very unlikely to be duplicated by noise.

The modular nature of the present interconnect network allows the same modules used to construct a small scale system to be used without modification to construct the largest. FIGS. 13 and 14 show tables of several exemplary multiprocessing systems which can be constructed using the interconnect network of the present invention. FIG. 13 shows a table of the module counts, section configurations and address bit layout for a multiprocessor system having 1–4 CPUs. FIG. 14 shows a table for exemplary multiprocessing systems having 8–32 CPUs. It shall be understood that the systems shown in FIGS. 13 and 14, and also the exemplary systems described and shown herein, are by no means the only multiprocessing systems which can be constructed using the present interconnect system. Rather, an infinite variety of configurations could be constructed without departing from the scope of the present invention.

Packeted Messaging

In the preferred embodiment, write references are sent by the CPUs to the memory modules 600 in two sequential packets. Read references are transferred in a single packet. For write references, the first packet contains all of the required address and control information and half of the write data. The second packet contains the second half of the write data. Because time is not of the essence for writes to common memory, this approach minimizes interconnects required on the outgoing paths of the network and memory modules.

In the preferred embodiment, the second packet follows the first packet into and through the switch on the immediately following clock period, travelling along the same interconnect path as the first packet. Because of this, each data movement takes two clock periods. Thus, the second packet exits each nxm switch of the memory and network modules exactly one clock period later than the first packet.

Those skilled in the art will readily recognize that packeting the write references and cycling them sequentially through the network and memory modules reduces by a factor of two the number of interconnects required to implement each nxm switch. In modern designs, there are more gates inside a chip by ratio than there are available interconnects to be able to use them. Therefore, interconnects are the scarce resource in many chip designs. For example, assume a 4×4 switch having four independent paths in and four independent paths out, and a 120 bitwide memory reference. The number of interconnects required to make such a crossbar switch would thus be eight times 120. Those skilled in the art will readily recognize that this is a very large number, much larger than could be fit on a single chip, and in fact much larger than could be fit on several chips. By packeting the memory references, the 120 bitwide memory reference is reduced by a factor of two. This reduces all system interconnects by a factor of two as well, a reduction which can be very significant. Those skilled in the art will recognize that this packeting method used in the present invention greatly compacts the system design, in that a each switch can be implemented in a single chips.

Read references, however, are not packeted as are the write references. On the outgoing path, a read reference contains only control information and the desired read address. However, because of the importance of having the read latency as small as possible, the return paths 606 and 304 of the memory and network modules, respectively, are a full word wide. Thus, each read reference is transferred every clock period instead of requiring two clocks like the outgoing path of a write reference. In addition, to further save on interconnects, the destination code (i.e., processor return address) is sent in the write data field of the outgoing read reference. Those skilled in the art will readily recognize that this approach further saves on the number of interconnects required on the outgoing path of the interconnect network.

Handshake Protocol

Smooth communication between successive layers of nxm switches in the network and memory modules is achieved through use of a READY/RESUME handshake protocol. FIG. 12 shows more detail of the control circuitry of a 1×1 switch 610 connected to a 4×4 switch 620. Although the present handshake protocol is explained with particular reference to the 1×1 and 4×4 switches shown in FIG. 12, it shall be understood that switches 610 and 620 are exemplary only and intended to be representative of any of the switches shown and described above with respect to FIGS. 6–11.

Each nxm switch in the present interconnect network includes a counter corresponding to each output of the switch. Thus, for example, 1×1 switch 610 shown in FIG. 12 includes one counter 612 corresponding to its single output path. 4×4 switch 620 includes four counters 624a–d, each of which corresponds to one of four group buffers 623a–d. Each counter has as its highest count value equal to the number of FIFO buffers in the destination switch. Thus, for example, counter 612 counts up to four, which is the number of buffers A–D in the FIFO 621a of 4×4 switch 620.

The counters are incremented or decremented by READY and RESUME handshake signals transmitted between the two switches. A READY signal will increment the counter. RESUME signal will decrement the counter. Thus as long as the value in counter 612 of 1×1 switch 610 is less than four, 1×1 switch 610 knows it can send another message to 4×4 switch 620. If the value of counter 612 equals four, 1×1 switch knows that the FIFO buffer 621a in 4×4 switch 620 is full and cannot accept another message from 1×1 switch 610.

The counter value starts at 0. Every time a message is sent out of buffer A of FIFO in 1×1 switch 610, a READY signal is also sent along with the message contents to 4×4 switch 620. The READY signal has two purposes. First, the READY signal is input to counter 612 every time a message is sent out of buffer A. The READY signal increments counter 612. Second, the READY signal is used by FIFO 621a as a valid signal for the message data being sent from 1×1 switch 610. Because the counter value starts at zero, 1×1 switch 610 can send four messages before it must wait for a RESUME signal to be sent from 4×4 switch 620.

Whenever a message leaves buffer A of FIFO 621a in 4×4 switch 620, a RESUME signal is sent back to 1×1 switch 610. The RESUME decrements the counter, indicating that one space is available in FIFO 621a.

The READY/RESUME handshake works identically for each nxm switch described herein. Smooth communication between each layer of switches in the present interconnect network is thus obtained.

Memory Timing

Figure 16A:
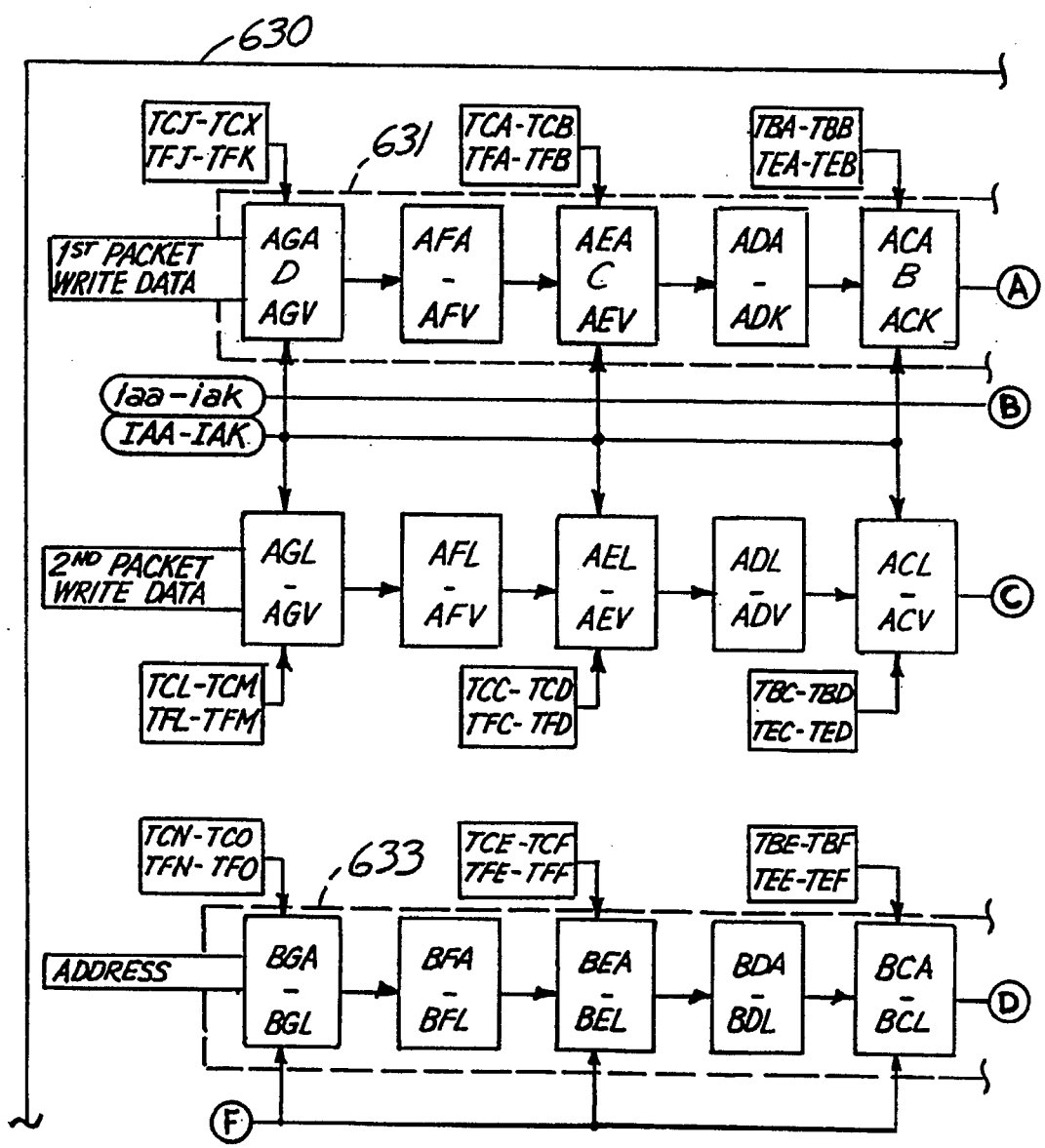
FIG. 16 shows more detail of the delay chain of a 1×2 switch.
Figure 16B:
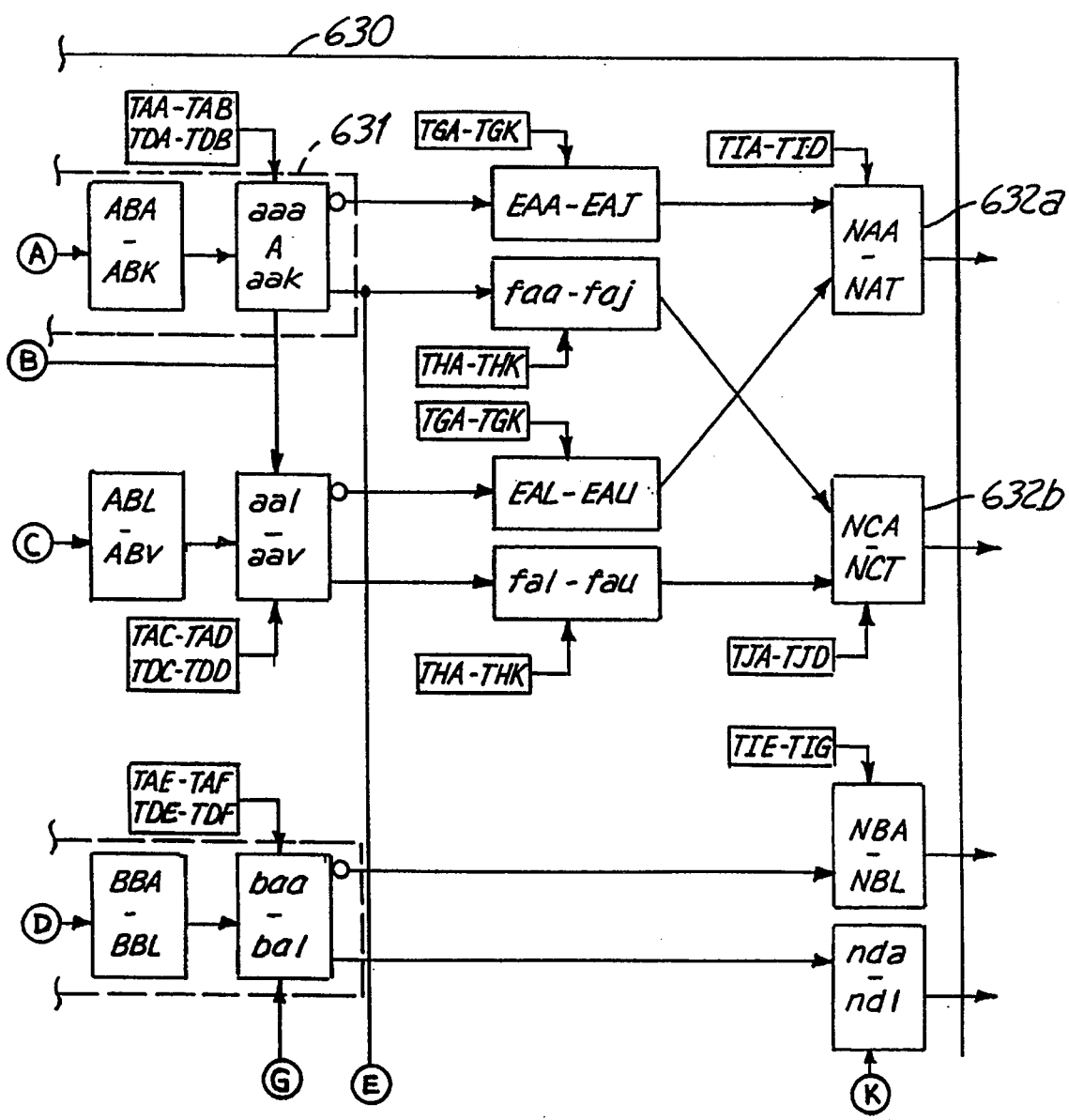
Figure 16D:
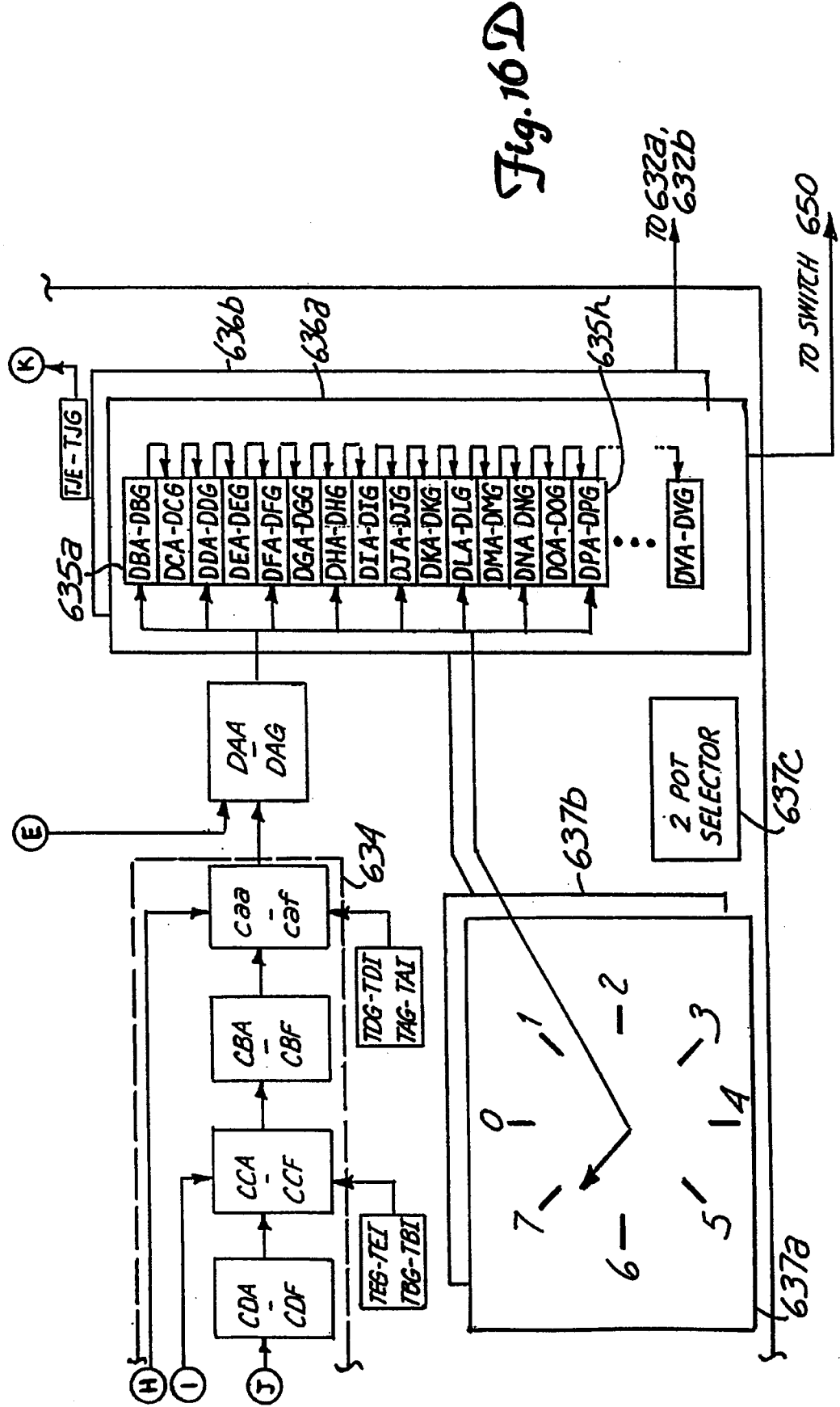

The preferred interconnect network is adaptable for use with a wide variety of memory access speeds and cycle times. The control circuitry is located in 1×2 switch 630 of each memory module 600. This switch is shown in more detail in FIG. 16. FIG. 16 shows the FIFO buffer 631, address path 633, control bit path 634, and delay chain 636 all of which are present in 1×2 switch 630. The delay chain 636 controls the delay through 1×2 switch 630 depending upon the memory speed and cycle time installed in the multiprocessing system. The memory access time of the memory installed in the multiprocessing system is signalled to 1×2 switch 630 by eight position selector 637a. Selector 637a controls the length of the delay chain 636a by controlling which input 635a–h a control tag is entered. The control tag enters the delay chain at one of the eight inputs 635a–h. The control tag contains the destination code, return address and other control information. Selector 637a controls which place in the delay chain 636a the control tag enters.

Once the tag enters the delay chain 636a the tag flows through the chain until it reaches the end of the delay chain 636a. Then the control tag is used to signal 2×1 switch 650 on the output side of the memory bank when it is time to sample the message data coming out of the memory bank and to load that message into the first available buffer of FIFO 652.

Memory cycle time is controlled similarly as memory access time. Eight position selector 637b controls a similar delay chain 636b in a manner as just described above. However, since selector 637b and delay chain 636b control memory cycle time, the output of the delay chain is sent up to buffers 632a and 632b of 1×2 switch 630 to control how often messages can leave the 1×2 switch and go to the memory bank.

A further selector 637c is a two position selector which indicates whether the memory parts installed in the multiprocessing system are pipelined or non-pipelined memory parts. Thus, the present interconnect network anticipates that many different memory types with different access times and cycle times can be used with the present interconnect network. For example, SRAM or πSRAM could be used. Depending on what memory is used, selectors 637 are appropriately set to correspond to the memory type.

Those skilled in the art will readily recognize and appreciate that the present interconnect network design greatly increases the scalability of a multiprocessing system. The interconnect network is very scalable because each n×m switch in the network and memory modules need only communicate with its neighbors. Each individual n×m switch does not need to have global information about the whole interconnect network or about what is happening two or three layers ahead. Each n×m switch needs only local information to arbitrate and send data between the CPUs and the memory. Similarly, the CPUs do not need to have global knowledge of the interconnect network or of memory response time before sending out memory references. In this way, the CPUs do not have to make sure that an entire data path from the CPU to the memory bank is clear before sending out a message. Using present interconnect network, the CPUs can simply "fire and forget". Those skilled in the art will appreciate that because the present interconnect network requires no global arbitrator, the system scales very easily by simple replication because there is no need for any redesign of the CPUs, the n×m switches, or the operating system. One need simply reconnect the components in a different configuration and the architecture instantly scales.

Another advantage of the present interconnect network is that it is independent of the CPU type used and also independent of memory speed. Any type of processor design that is independent of memory response time is adaptable to the system of the present invention. One such processor design can be found in the copending and commonly assigned patent application entitled "SCALABLE PARALLEL VECTOR COMPUTER SYSTEM", Ser. No. 07/600,328, filed Oct. 19, 1990, to Oberlin et al., which application is incorporated herein by reference. Also, even if every bank of memory were at a different speed, the present interconnect network would still work without having to do a complicated redesign. Those skilled in the art will recognize that the design of the present interconnect network is therefore extremely flexible in this respect. Thus, the CPU used with the present interconnect network is not time sensitive and can therefore operate efficiently even with a larger memory latency. The design of the present interconnect network achieves an increased bandwidth so that a large volume of data can be moved between the CPUs and memory. Those skilled in the art will readily recognize and appreciate that such a design scheme results in a very high throughput machine at a very high bandwidth; a design which is particularly well suited for highly parallel vector processing tasks.

Although a specific embodiment has been illustrated and described herein, it will be appreciated by those skilled in the art that any arrangement which is calculated to achieve the same purpose may be substituted for the specific embodiment shown. For example, the architecture of the present invention may be implemented with a different number of processors, different amounts of memory, or a different number of program threads per processor. In addition, those skilled in the art will recognize that, the architecture of the present invention is not dependent upon the specific type of processor used, the speed of memory, or the specific logic designs disclosed in the detailed description. Different types of processors could be used without departing from the scope of the present invention.

This application is intended to cover any adaptations or variations of the present invention. Therefore, it is manifestly intended that this invention be limited only by the claims and the equivalents thereof.

We claim:

1. A memory module, comprising:

a plurality of inputs;

a plurality of outputs;

a plurality of memory banks;

a first routing network connecting the plurality of inputs to the plurality of memory banks, wherein the first routing network comprises a plurality of switches, including a first switch and a crossbar switch, wherein the first switch includes a FIFO queue structure used to queue packets being transferred to one of said memory banks and wherein the crossbar switch includes a FIFO queue structure connected to the first switch of the first routing network to buffer packets received from said first switch, wherein the packets include a plurality of message steering bits and wherein some of said plurality of switches include steering bit replacement means for replacing one or more of the plurality of message steering bits with bits representing inputs to its respective switch; and a second routing network connecting the plurality of memory banks to the plurality of outputs, wherein the second routing network comprises a plurality of switches, including a first switch having a FIFO queue structure used to queue packets being transferred from one of said memory banks.

2. The memory module according to claim 1 wherein the FIFO queue structure in said first routing network comprises N entries, wherein the number N is selected to cover a round trip communication time between designated switches.

3. The memory module according to claim 1 wherein the crossbar switch further includes an output request buffer used to temporarily store a packet during packet transmission.

4. The memory module according to claim 1 wherein each memory bank comprises a plurality of memory devices, wherein each memory device has an access time and a cycle time, each memory bank further comprising delay means for adjusting the speed of the memory banks dependent on the access time and cycle time of the plurality of memory devices.

5. The memory module according to claim 1 wherein the FIFO queue structure in said second routing network has a depth sufficient to handle a pipelined memory part.

6. A memory module, comprising:

a plurality of inputs;

a plurality of outputs;

a plurality of memory banks;

a first routing network connecting the plurality of inputs to the plurality of memory banks, wherein the first routine network comprises a plurality of switches, including a first switch having a FIFO queue structure used to queue packets being transferred to one of said memory banks, wherein the packets include a plurality of message steering bits and wherein some of said plurality of switches include steering bit replacement means for replacing one or more of the plurality of message steering bits with bits representing inputs to its respective switch; and a second routing network connecting the plurality of memory banks to the plurality of outputs, wherein the second routing network comprises a plurality of switches, including a first switch and a crossbar switch, wherein the first switch includes a FIFO queue structure used to queue packets being transferred from one of said memory banks and wherein the crossbar switch includes a FIFO queue structure connected to the first switch of the second routing network to buffer packets received from said first switch.

7. The memory module according to claim 6 wherein the crossbar switch further includes an output request buffer used to temporarily store a packet during packet transmission.

8. The memory module according to claim 6 wherein the crossbar switch further includes means for replacing a plurality of message steering bits with bits representing one of the plurality of memory banks.

9. An interconnect network for routing packets between a plurality of CPUs and a plurality of memory modules in a multiprocessor system, wherein the packets include a plurality of message steering bits, the network comprising:

an outgoing network connecting the plurality of CPUs to the plurality of memory modules, wherein the outgoing network comprises:

first and second crossbar switches, wherein each of said first and second crossbar switches includes steering bit replacement means for replacing some of the plurality of message steering bits with bits representing inputs to said crossbar switches and wherein one of said first and second crossbar switches includes a FIFO queue structure used to queue packets being transferred through said switch; and an input buffer connected to said first crossbar switch and to said plurality of CPUs to transfer packets from said CPUs to said first crossbar switch; and an incoming network connecting the plurality of memory modules to the plurality of CPUs, wherein the incoming network comprises:

first and second crossbar switches, wherein one of said first and second crossbar switches includes a FIFO queue structure used to queue packets being transferred through said switch; and an input buffer connected to said memory modules and said first crossbar switch to transfer packets from said memory modules to said first crossbar switch.

10. The interconnect network according to claim 9 wherein the input buffer of the outgoing network comprises a FIFO queue structure used to queue packets being transferred to said switch.

11. The interconnect network according to claim 9 wherein one of said first and second crossbar switches of said outgoing network further includes an output request buffer used to temporarily store a packet during packet transmission.

12. The interconnect network according to claim 9 wherein the input buffer of the incoming network comprises a FIFO queue structure used to queue packets being transferred to said switch.

13. The interconnect network according to claim 9 wherein one of said first and second crossbar switches of said incoming network further includes an output request buffer used to temporarily store a packet during packet transmission.

14. The interconnect network according to claim 9 wherein said first and second crossbar switches of said incoming network further include means for replacing some of the plurality of message steering bits with bits representing inputs to said crossbar switches.

15. A computing system, comprising:

a plurality of CPUs;

a plurality of memory modules; and an interconnect network connected said plurality of CPUs and to said plurality of memory modules and operable to transfer packets from any one of the plurality of CPUs to any one of the plurality of memory modules, wherein the packets include a plurality of message steering bits, the interconnect network comprising:

an outgoing network connecting the plurality of CPUs to the plurality of memory modules, wherein the outgoing network comprises:

first and second crossbar switches, wherein each of said first and second crossbar switches includes steering bit replacement means for replacing some of the plurality of message steering bits with bits representing inputs to said crossbar switches and wherein one of said first and second crossbar switches includes a FIFO queue structure used to queue packets being transferred through said switch; and an input buffer connected to said first crossbar switch and to said plurality of CPUs to transfer packets from said CPUs to said first crossbar switch; and an incoming network connecting the plurality of memory modules to the plurality of CPUs, wherein the incoming network comprises:

first and second crossbar switches, wherein one of said first and second crossbar switches includes a FIFO queue structure used to queue packets being transferred through said switch; and an input buffer connected to said memory modules and said first crossbar switch to transfer packets from said memory modules to said first crossbar switch.

16. The interconnect network according to claim 15 wherein the input buffer of the outgoing network comprises a FIFO queue structure used to queue packets being transferred to said switch.

17. The interconnect network according to claim 15 wherein one of said first and second crossbar switches of said outgoing network further includes an output request buffer used to temporarily store a packet during packet transmission.

18. The interconnect network according to claim 15 wherein the packets comprise message steering bits and wherein said first and second crossbar switches of said outgoing network further include means for replacing a plurality of said message steering bits with bits representing inputs to said crossbar switches.

19. The interconnect network according to claim 15 wherein the input buffer of the incoming network comprises a FIFO queue structure used to queue packets being transferred to said switch.

20. The interconnect network according to claim 15 wherein one of said first and second crossbar switches of said incoming network further includes an output request buffer used to temporarily store a packet during packet transmission.

21. The interconnect network according to claim 15 wherein said first and second crossbar switches of said incoming network further include means for replacing some of the plurality of message steering bits with bits representing inputs to said crossbar switches.

22. A method of reading memory in a memory module, wherein the method comprises the steps of:

providing an outgoing network connected to the memory module, wherein the outgoing network comprises an input, an output and a plurality of stages connecting the input to the output, wherein each stage comprises a switch and a buffer and wherein the plurality of stages includes a first stage;

providing an incoming network connected to the memory module, wherein the incoming network comprises an input, an output and a plurality of stages connecting the input to the output, wherein each stage comprises a switch and a buffer and wherein the plurality of stages includes a first stage;

transferring a read command packet having message steering bits to the input of the outgoing network;

storing the read command packet in a buffer at the first stage of the outgoing network;

if a route is clear to a next stage of the outgoing network transferring the read command packet to the next stage of the outgoing network and modifying the message steering bits to indicate where the read command packet came from;

if all stages of the outgoing network have been traversed, transferring the read command packet to the memory module and modifying the message steering bits to indicate where the read command packet came from;

storing the read command packet in a buffer in the memory module;

reading memory at a location indicated by the read command packet to obtain data;

transferring the data in a data packet to the input of the incoming network, wherein the data packet includes message steering bits;

storing the data packet in a buffer at the first stage of the incoming network; and if a route is clear to a next stage of the incoming network, transferring the data packet to the next stage of the incoming network and modifying the message steering bits to indicate where the data packet came from.

23. A method of writing memory in a memory module, wherein the method comprises the steps of:

providing an outgoing network connected to the memory module, wherein the outgoing network comprises an input, an output and a plurality of stages connecting the input to the output, wherein each stage comprises a switch and a buffer and wherein the plurality of stages includes a first stage;

providing an incoming network connected to the memory module, wherein the incoming network comprises an input, an output and a plurality of stages connecting the input to the output, wherein each stage comprises a switch and a buffer and wherein the plurality of stages includes a first stage;

transferring a write command packet to the input of the outgoing network, wherein the write command packet includes an address, message steering bits and write data;

storing the write command packet in a buffer at the first stage of the outgoing network;

if a route is clear to a next stage of the outgoing network, transferring the write command packet to the next stage of the outgoing network and modifying the message steering bits to indicate where the write command packet came from;

if all stages of the outgoing network have been traversed, transferring the write command packet to the memory module and modifying the message steering bits to indicate where the write command packet came from;

storing the write command packet in a buffer in the memory module; and storing the write data at a location indicated by the address.

* * * * *